United States Patent
Hegeman et al.

(10) Patent No.: US 12,296,359 B2
(45) Date of Patent: May 13, 2025

(54) SYSTEM FOR AUTONOMOUSLY APPLYING PAINT TO A TARGET SURFACE

(71) Applicant: Foreman Technologies Inc., Hendersonville, TN (US)

(72) Inventors: Nick Hegeman, Hendersonville, TN (US); Sonia Chacko, Hendersonville, TN (US); Tom Jose, Hendersonville, TN (US); Kevin Ozbirn, Hendersonville, TN (US); Vineeth Budamkayala, Hendersonville, TN (US); Piyush Warhade, Hendersonville, TN (US); Matt Lopez, Hendersonville, TN (US)

(73) Assignee: Foreman Technologies Inc., Hendersonville, TN (US)

( * ) Notice: Subject to any disclaimer, the term of this patent is extended or adjusted under 35 U.S.C. 154(b) by 0 days.

(21) Appl. No.: 18/747,315

(22) Filed: Jun. 18, 2024

(65) Prior Publication Data

US 2024/0335855 A1   Oct. 10, 2024

Related U.S. Application Data

(63) Continuation of application No. 18/137,374, filed on Apr. 20, 2023, now Pat. No. 12,036,577.
(Continued)

(51) Int. Cl.
*B05B 12/08* (2006.01)
*B05D 1/36* (2006.01)
(Continued)

(52) U.S. Cl.
CPC ............... *B05D 1/36* (2013.01); *B05D 7/52* (2013.01); *G06T 7/0004* (2013.01);
(Continued)

(58) Field of Classification Search
CPC .............. G06T 7/11; G06T 7/0004; G06T 2207/20221; B05D 1/36
See application file for complete search history.

(56) References Cited

U.S. PATENT DOCUMENTS 6,252,231 B1 *   6/2001   Harootian ................. G01T 1/20
                                                          250/367
2019/0161844 A1 *   5/2019   Hanson ..................... C23C 4/12
(Continued)

OTHER PUBLICATIONS

Chen et al., "Trajectory Planning for Spray Painting Robot Based on Point Cloud Slicing Technique" (2020) (Year: 2020).*

*Primary Examiner* — Nathan T Leong
(74) *Attorney, Agent, or Firm* — Run8 Patent Group, LLC; Peter Miller

(57) ABSTRACT

One variation of a method includes: navigating a set of spray nozzles across a first segment of the target surface according to a toolpath; applying paint onto the first segment of the target surface via the set of spray nozzles; accessing a first image depicting paint applied onto the first segment of the target surface; navigating the set of spray nozzles across a second segment of the target surface according to the toolpath; applying paint onto the second segment of the target surface via the set of spray nozzles; accessing a second image depicting paint applied onto the second segment of the target surface; and aggregating the first image and the second image into a paint map representing application of paint onto the first segment and the second segment of the target surface.

20 Claims, 5 Drawing Sheets

Related U.S. Application Data

(60) Provisional application No. 63/333,093, filed on Apr. 20, 2022, provisional application No. 63/333,100, filed on Apr. 20, 2022.

(51) Int. Cl.
  *B05D 7/00* (2006.01)
  *G06T 7/00* (2017.01)
  *G06T 7/11* (2017.01)
  *G06T 11/00* (2006.01)

(52) U.S. Cl.
  CPC .............. *G06T 7/0008* (2013.01); *G06T 7/11* (2017.01); *G06T 11/00* (2013.01); *G06T 2207/20212* (2013.01); *G06T 2207/20221* (2013.01)

(56) References Cited

U.S. PATENT DOCUMENTS

2019/0374966 A1* 12/2019 Thompson ............ B05B 12/085
2020/0197969 A1* 6/2020 Hegeman .............. B05B 9/0423

\* cited by examiner

SYSTEM FOR AUTONOMOUSLY APPLYING PAINT TO A TARGET SURFACE

CROSS-REFERENCE TO RELATED APPLICATIONS

This application is a continuation application of U.S. patent application Ser. No. 18/137,374, filed on 20 Apr. 2023, which claims the benefit of U.S. Provisional Application No. 63/333,093, filed on 20 Apr. 2022, and 63/333,100, filed on 20 Apr. 2022, each of which is incorporated in its entirety by this reference.

TECHNICAL FIELD

This invention relates generally to the field of coating applications and more specifically to a new and useful system for autonomously applying paint to a target surface in the field of coating applications.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

As shown in FIGS. 1-4, a method S100 for applying paint to a target surface includes, during a scan cycle: at a first optical sensor defining a field of view intersecting a spray field of a set of spray nozzles, capturing a first image depicting a target surface of the building in Block S110; extracting a first set of features from the first image in Block S114; and, based on the first set of features, defining a first target zone on a first segment of the target surface and defining a second target zone on a second segment above the first segment of the target surface.

The method S100 further includes, during a first paint application cycle: navigating the set of spray nozzles across the first segment of the target surface in Block S130; in response to detecting the set of spray nozzles facing the first target zone, applying paint within the first target zone onto the first segment of the target surface via the set of spray nozzles in Block S140; and, at a second optical sensor adjacent the set of spray nozzles, capturing a second image depicting paint applied within the first target zone on the first segment of the target surface in Block S150.

The method S100 also includes, during a second paint application cycle: navigating the set of spray nozzles across the second segment of the target surface in Block S130; in response to detecting the set of spray nozzles facing the second target zone, applying paint from the set of spray nozzles within the second target zone onto the second segment of the target surface via the set of spray nozzles in Block S140; and, at the second optical sensor, capturing a third image depicting paint applied within the second target zone on the second segment of the target surface in Block S150. The method S100 further includes combining the second image and the third image into a composite image representing application of paint onto the first segment and the second segment of the target surface in Block S160.

1.1 Variation: Masking Tape Colors

Figure 1A:
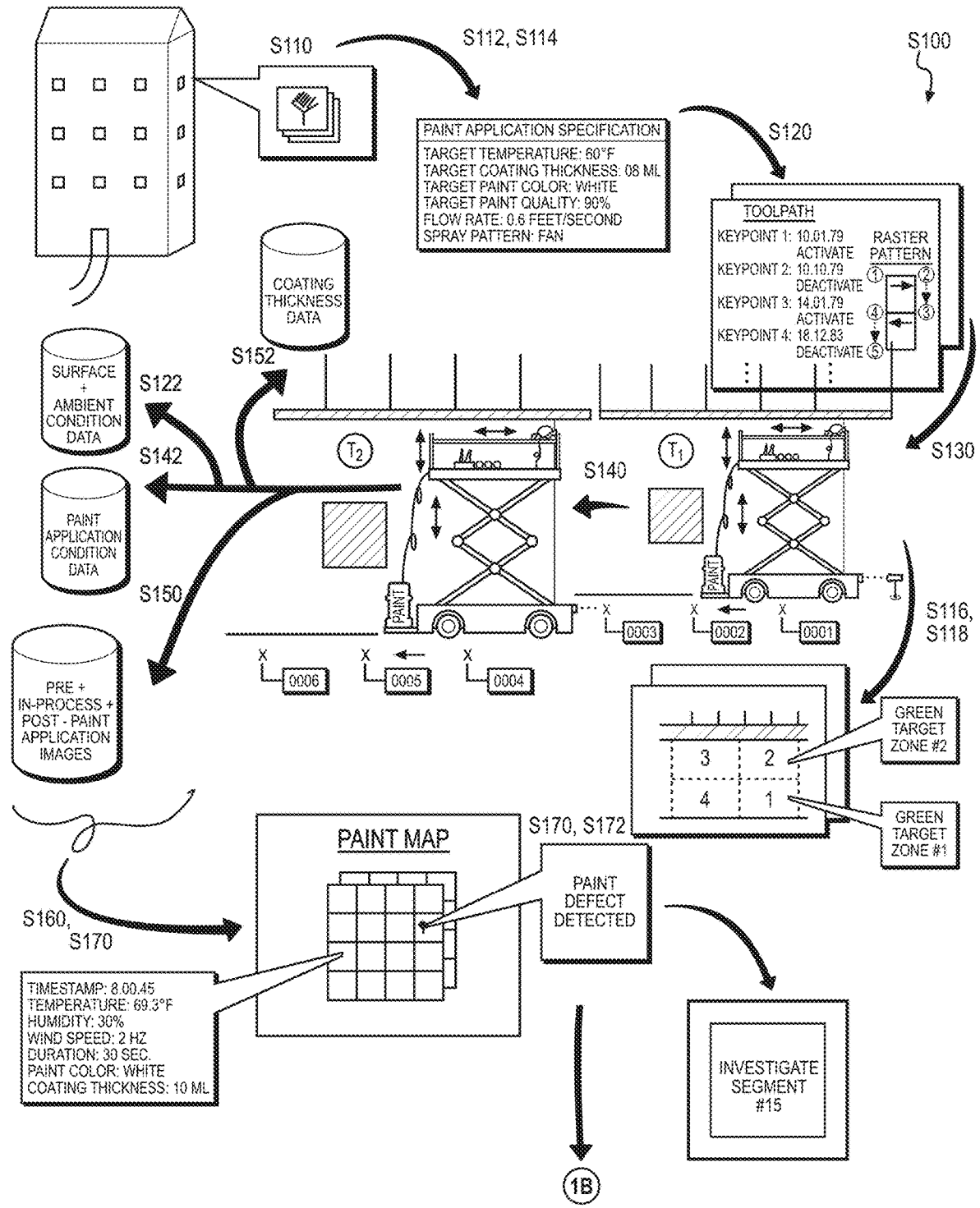
FIGS. 1A and 1B is a flowchart representation of a method.

As shown in FIG. 1A, one variation of the method S100 includes: at an optical sensor mounted adjacent a set of spray nozzles, capturing a first image depicting a target surface of the building in Block S110; extracting a set of features from the first image in Block S114; based on the set of features, detecting a first masking tape color in a first segment of the target surface in Block S116 and detecting a second masking tape color in a second segment of the target surface in Block S116; and identifying a target zone on the first segment of the target surface based on the first masking tape color in Block S118; and identifying a keepout zone, adjacent the target zone, on the second segment of the target surface based on the second masking tape color in Block S118.

This variation of the method S100 also includes, during a first paint application cycle: navigating the set of spray nozzles across the first segment of the target surface in Block S130; and, in response to detecting the set of spray nozzles facing the target zone on the first segment of the target surface, activating the set of spray nozzles, to apply paint within the first target zone on the first segment of the target surface in Block S140. This variation of the method S100 also includes, during a second paint application cycle: navigating the set of spray nozzles across the second segment of the target surface; and, in response to detecting a subset of spray nozzles, in the set of spray nozzles, facing the keepout zone on the second segment of the target surface, deactivating the subset of spray nozzles, in the set of spray nozzles, to prevent application of paint within the keepout zone on the second segment of the target surface.

1.2 Variation: Paint Map

One variation of the method S100 includes: at an optical sensor mounted to a spray system, capturing a first sequence of images depicting a target surface of the building in Block S110; and accessing a toolpath including a set of keypoints for execution by the spray system in Block S120.

This variation of the method S100 further includes, during a first paint application cycle: autonomously traversing the set of spray nozzles across the first segment of the target surface according to the toolpath in Block S130; in response to the set of spray nozzles facing a first keypoint, in the set of keypoints, applying paint onto the first segment of the target surface in Block S140; and, at the optical sensor, capturing a second sequence of images depicting paint applied onto the first segment of the target surface in Block S150.

This variation of the method S100 also includes, during a second paint application cycle: autonomously traversing the set of spray nozzles across a second segment above the first segment of the target surface according to the toolpath in Block S130; in response to the set of spray nozzles facing a second keypoint, in the set of keypoints, applying paint onto the second segment of the target surface in Block S140; and, at the optical sensor, capturing a third sequence of images depicting paint applied onto the second segment of the target surface in Block S150. This variation of the method S100 further includes aggregating the first sequence of images, the second sequence of images, and the third sequence of images, into a paint map representing application of paint onto the first segment and the second segment of the target surface in Block S160.

1.3 Variation: Paint Map+Defect Detection

One variation of the method S100 includes, during a first paint application cycle: autonomously navigating a spray system along a toolpath to apply paint across a first segment of the target surface via a first spray nozzle in Block S140; and capturing a first sequence of images depicting paint applied on the first segment of the target surface via an optical sensor adjacent the first spray nozzle in Block S150.

This variation of the method S100 further includes, during a second paint application cycle: autonomously navigating a spray system along the toolpath to apply paint across a second segment of the target surface via the first spray nozzle in Block S140; and capturing a second sequence of images depicting paint applied on the second segment of the target surface via the optical sensor adjacent the first spray nozzle in Block S150.

This variation of the method S100 also includes: assembling the first sequence of images into a paint map representing application of paint on the first segment of the target surface in Block S160; extracting a first set of features corresponding to the first segment of the target surface from the paint map in Block S170; detecting presence of the first defect on the first segment of the target surface based on the first set of features in Block S172; annotating the paint map to indicate the first defect in Block S180; and serving the paint map to an operator for inspection of the first defect in Block S190.

1.4 Variation: Incomplete Paint Coverage Defect Detection

One variation of the method S100 includes: capturing an initial sequence of images depicting a first segment of the target surface prior to application of paint via an optical sensor adjacent a spray nozzle in Block S110; and extracting an initial color value of the target surface from the initial sequence of images in Block S112. This variation of the method S100 further includes, during a first paint application cycle: navigating the spray nozzle along a toolpath to apply paint on the first segment of the target surface in Block S130; and capturing a first sequence of images depicting paint applied on the first segment of the target surface via the optical sensor adjacent the spray nozzle in Block S150.

This variation of the method S100 also includes, during a second paint application cycle, autonomously navigating the spray system along the toolpath to apply paint across a second segment of the target surface via the spray nozzle in Block S130; and capturing a second sequence of images depicting paint applied on the second segment of the target surface via the optical sensor adjacent the first spray nozzle in Block S150. This variation of the method S100 further includes: assembling the first sequence of images into a paint map representing application of paint on the first segment of the target surface in Block S160; accessing a paint application specification defining a target color value for application of paint on the target surface in Block S112; extracting a first color value of paint applied onto the first segment of the target surface from the paint map in Block S170; detecting an incomplete paint coverage defect on the first segment of the target surface based on the first color value deviating from the target color value toward the initial color value in Block S172; and annotating the paint map to indicate the incomplete coverage defect in Block S180.

1.5 Variation: Paint Thickness+Defect Detection

One variation of the method S100 includes: accessing a spray pattern for a spray nozzle mounted to a spray system in Block S112; and capturing an initial sequence of images depicting a first segment of the target surface prior to application of paint via an optical sensor adjacent a spray nozzle in Block S110.

This variation of the method S100 further includes, during a first paint application cycle: autonomously navigating the spray system along a toolpath to apply paint across the first segment of the target surface via the spray nozzle in Block S140; capturing a first sequence of images depicting paint applied on the first segment of the target surface via the optical sensor in Block S150; and predicting a first paint thickness of paint applied on the first segment of the target surface based on the spray pattern of the spray nozzle in Block S152.

This variation of the method S100 also includes: assembling the initial sequence of images and the first sequence of images into a paint map representing application of paint on the first segment of the target surface in Block S160; annotating the paint map with a paint thickness gradient based on the first paint thickness; extracting a first surface discontinuity corresponding to the first segment of the target surface from the paint map in Block S170; detecting presence of the first defect on the first segment of the target surface based on the first surface discontinuity in Block S172; and annotating the paint map to indicate the first defect on the first segment of the target surface in Block S180.

2. Applications

Generally, the system and the computer system cooperate: to autonomously apply (e.g., spray, dispense) paint onto exterior walls (e.g., target surfaces) of a building during a paint application procedure; to capture pre-paint application, in-process paint application, and/or post-paint application images of these walls of the building during the paint application procedure; capture surface condition, ambient condition, paint application condition, spray system operation, and spray nozzle position data during the paint application procedure; estimate thicknesses of paint (e.g., volumes of paint, coats of paint) applied within discrete (e.g., one-foot-square) segments across these walls of the building based on these data; and to compile these data into a paint map of the building representing paint application data and results of the paint application procedure.

In particular, the system can execute a paint application procedure to autonomously apply paint (e.g., a volume of paint, a coat of paint)—over target surfaces of a building—according to target conditions defined in a paint application specification for the paint loaded into the system, such as: a target paint thickness; a target ambient air temperature; a target surface temperature; a target paint color; a target paint temperature; and/or a target spray overlap; etc.

Furthermore, the computer system can: compile data captured by the system during the paint application procedure into a paint map that contains visual and non-visual data representing paint application conditions and results; detect regions in the paint map that indicate paint application conditions or results (e.g., surface discontinuities) outside of the paint application specification (e.g., deviating from target conditions); identify these regions in the paint map as a paint defect (e.g., incomplete coverage, sag, run, flaking, blistering, curtain, rust); and flag corresponding segments of target surfaces of the building for paint defect inspection and/or for targeted onsite paint defect inspection by an operator and/or a building associate. The computer system can also interface with the system to serve the annotated paint map and prompts to the operator via an operator portal and/or a computing device (e.g., a mobile device, a tablet) to selectively inspect these flagged paint defects. Thus, the computer system and the system cooperate to enable the operator and/or the building associate to inspect paint defects remotely and rapidly on the building via the operator portal, and thereby reduce the operator's and/or building associate's inspection duration of the building.

Additionally, the computer system can: access a template defect image database containing defect images labeled with a defect type, a defect score, and a paint application procedure; detect images from the post-paint application layer of the paint map that indicate paint application conditions corresponding to the defect images; identify segments of target surfaces of the building—depicted in the images from the pos-paint application layer—within the paint map as a paint defect (e.g., incomplete coverage, sag, run, flaking, blistering, curtain); and compile these paint defects into a list ranked by defect score and serve this list to the operator and/or the building associate for paint defect inspection and/or for targeted onsite paint defect inspection. Thus, the computer system and system cooperate to enable the operator and/or the building associate to target the most significant paint defects (e.g., severe paint defects) from a paint application procedure according to the list of paint defects.

Furthermore, the computer system can compile these data captured by the system during the paint application procedure into a live progress report; and serve this progress report to the operator and/or the building associate. Similarly, the computer system and/or the system can: detect nearby objects that may be sensitive to overspray; generate targeted prompts to relocate these objects as the system autonomously navigates along the building; and timely serve these prompts to the operator and/or the building associate to enable the system to continuous apply paint to the building with no or minimal risk of overspray on such objects.

Therefore, the computer system and the system can cooperate: to autonomously apply paint to exterior walls of a building according to a paint application specification during a paint application procedure; to compile data captured during the paint application procedure into a paint map of the building that defines a virtual representation of the paint application procedure and results; and to detect and annotate predicted paint defects within the paint map.

However, the computer system and/or the system can additionally or alternatively cooperate to apply paint to interior walls, exterior walls, and/or mutable surfaces (e.g., curved surfaces) of a building, a ship (e.g., a ship hull) aircraft, manufacturing equipment, port equipment, and/or shipping containers, etc.

3. System

A system for autonomously applying paint to a building includes: a chassis including a drive system; a work platform configured to raise and lower on the chassis; a spray system including a set of spray nozzles and a paint supply subsystem configured to selectively supply wet paint from a paint reservoir to the set of spray nozzles; an end effector; an optical sensor; a depth sensor; and a controller. The end effector is mounted to the work platform and is configured to support the set of spray nozzles on the work platform and to direct the set of spray nozzles over a range of positions. The optical sensor is arranged on the work platform and is configured to capture images of a target surface on the building. The depth sensor is configured to output distance values representative of distances between the set of spray nozzles and the target surface.

The controller is configured to autonomously: detect target zones and keepout zones, on the target surface, proximal the set of spray nozzles based on features detected in images captured by the optical sensor; actuate the drive system to navigate the chassis along lateral segments of the target surface; actuate the work platform to navigate the set of spray nozzles vertically within lateral segments of the target surface; actuate the end effector to direct paint, exiting the set of spray nozzles, across lateral segments of the target surface; selectively actuate the spray system to dispense paint from the set of spray nozzles in response to detecting target zones proximal the set of spray nozzles; and selectively deactivate the spray system in response to detecting keepout zones proximal the set of spray nozzles. The controller is further configured to, for each segment of the target surface: estimate a paint thickness of paint applied to the segment of the target surface based on paint flow rate through the spray system and actuation speed of the end effector during application of paint onto the segment of the target surface; and store the paint thickness in association with a location of the segment on the target surface. The controller is also configured to store an image, captured by the camera and depicting the segment of the target surface, in association with the segment of the target surface.

The system can interface with a computer system that assembles locations of segments on the target surface, corresponding paint thicknesses, and corresponding images captured by the system into a paint map that represent paint application across the target surface of the building.

3.1 End Effector

In one implementation, the end effector includes a linear stage configured to cycle the set of spray nozzles laterally across a target surface of the building. In this implementation, the controller can actuate the single linear stage to cyclically drive the set of spray nozzles laterally across a segment (e.g., a four-foot-wide segment) of the target surface while intermittently lowering (or raising) the work platform, thereby rastering the set of spray nozzles across the segment of the target surface and maintaining the set of spray nozzles substantially normal to the target surface.

Additionally or alternatively, the controller can access a paint application specification of paint loaded into the spray system defining: a first width of the first segment of the target surface (e.g., a four-foot-wide segment); and a second width of the second segment of the target surface (e.g., a four-foot-wide segment). The controller can then actuate the single linear stage to: raster the set of nozzles across the first width to apply paint laterally across the first segment of the target surface; and raster the set of nozzles across the second width to apply paint laterally across the second segment of the target surface.

In another implementation, the end effector includes a set of linear stages configured to cycle the set of spray nozzles laterally and vertically across the target surface. In this implementation, the controller can actuate the set of linear stages to drive the set of spray nozzles vertically and laterally across a segment (e.g., a four-foot-wide, four-foot-tall segment) of the target surface, thereby rastering the set of spray nozzles across this segment of the target surface and maintaining the set of spray nozzles substantially normal to the target surface. In this implementation, following completion of application of paint onto this segment of the target surface, the computer system can trigger the work platform to lower (or rise) to locate the set of spray nozzles in a next segment of the target surface.

In one example, the controller can actuate a first linear stage to drive the set of spray nozzles vertically across the height of the first segment (e.g., four-foot-tall) of the target surface. The controller can then actuate the second linear stage to: raster the set of spray nozzles laterally across the width of the first segment (e.g., four-foot-wide) to apply paint laterally across the first segment of the target surface. Then, following completion of application of paint onto the first segment of the target surface, the controller can actuate the first linear stage to drive the set of spray nozzles vertically across the height of the second segment (e.g., four-foot-tall) of the target surface. The controller can then actuate the second linear stage to: raster the set of spray nozzles laterally across the width of the second segment (e.g., four-foot-wide) to apply paint laterally across the second segment of the target surface. Thus, the controller can actuate the set of linear stages to drive the set of spray nozzles vertically across segments (e.g., lower, rise) of the target surface and maintain the set of spray nozzles substantially normal to the target surface.

In another example, the controller can actuate a first linear stage to cyclically drive the set of spray nozzles vertically across a first segment (e.g., a four-foot-wide segment) of the target surface while intermittently lowering (or raising) the work platform. Then, following completion of application of paint onto the first segment of the target surface, the controller can actuate a second linear stage to drive the set of spray nozzles vertically across a second segment (e.g., a four-foot-tall segment) of the target surface.

In the foregoing implementations, the end effector can further include a depth stage configured to drive the set of spray nozzles—and coupled depth sensors—longitudinal substantially normal to the target surface. Accordingly, the controller can: monitor a distance between the set of spray nozzles and the target surface via the depth sensor; and implement closed-loop controls to maintain a target distance between the set of spray nozzles and the target surface by selectively actuating the depth stage of the end effector.

Additionally or alternatively, the end effector can include a set of rotary stages configured to adjust pitch and/or yaw orientations of the set of spray nozzles and coupled depth sensors. In this implementation, the controller can: monitor distances between the set of spray nozzles and a set of (e.g., three or more) laterally- and vertically offset points on an adjacent region of the target surface via the depth sensor; and implement closed-loop controls to adjust the pitch and/or yaw orientations of the end effector and equalize distances to these three points on the adjacent region of the target surface, thereby maintaining the set of spray nozzles normal to the region of the target surface in its spray field.

For example, the end effector can include a multi-axis gantry. Alternatively, the end effector can include a robotic arm including multiple segments and joints.

3.2 Optical and Depth Sensors

In one implementation, the system includes a near-field 2D color (e.g., RGB, multispectral) camera: arranged proximal the set of spray nozzles and defining a focal axis approximately parallel to a spray axis of the set of spray nozzles such that the field of view of the color camera intersects a spray field of the set of spray nozzles; and configured to capture 2D color images of the target surface before, during, and/or after the set of spray nozzles applies (i.e., sprays) paint on the adjacent target surface. For example, the system can include: a left color camera arranged to the left of the set of spray nozzles and configured to capture images of the target surface ahead of the set of spray nozzles as the end effector moves the set of spray nozzles leftward; and a right color camera arranged to the right of the set of spray nozzles and configured to capture images of the target surface ahead of the set of spray nozzles as the end effector moves the set of spray nozzles rightward.

Additionally or alternatively, the system can include a near-field 3D stereoscopic camera arranged proximal the set of spray nozzles and configured to capture 3D color images of the target surface. The system can similarly include a near-field multi-point depth sensor (e.g., a set of single-point depth sensors, a 3D LIDAR sensor): arranged proximal the set of spray nozzles and defining a focal axis approximately parallel to the spray axis of the set of spray nozzles; and configured to capture depth values or depth maps representing distances from the set of spray nozzles to points on the target surface in the spray field of the set of spray nozzles.

For example, the depth sensor can be configured to detect: peripheral distances to at least three discrete points—on a nearby surface—offset about a 20-inch-diameter circle centered on the axis of the set of spray nozzles at a distance of twelve-inches from the set of spray nozzles; and a center distance to a discrete point-on the nearby surface-approximately centered on the axis of the set of spray nozzles at a distance of twelve-inches from the set of spray nozzles.

In the foregoing implementations, the system can also include a housing with an actuatable aperture arranged adjacent the set of spray nozzles, such as mounted on or near the end effector. In this implementation, the near-field color, the near-field stereoscopic camera, and/or the depth sensor can be arranged in the housing. Accordingly, the controller can: trigger the aperture to close when the spray system is actuated in order to shield these sensors from overspray; and selectively trigger the aperture to open and these sensors to capture images, depth values, and/or depth maps when the spray system is inactive.

Additionally or alternatively, the system can include a far-field 2D color camera, a far-field 3D stereoscopic camera, and/or a far-field depth sensor, such as: arranged on the work platform; and offset behind the set of spray nozzles (e.g., where these sensors are less subject to overspray).

In the foregoing implementations, the near-field sensors can be arranged on the end effector and thus move with the set of spray nozzles. Alternatively, these near-field sensors can be fixedly mounted to the work platform, and the controller can: derive a position (i.e., offset distance and orientation) of the work platform relative to the target surface based on data captured by these sensors; track a position of the set of spray nozzles relative to the work platform (e.g., by reading position sensors or encoders arranged on actuators or stages in the end effector); and fuse these platform-to-target-surface data positions and platform-to-spray nozzle positions to track the position of the set of spray nozzles relative to the nearby target surface.

The far-field optical and depth sensors can be similarly coupled to or decoupled from the end effector and the set of spray nozzles, and the controller can similarly track relative positions of the target surface, these far-field sensors, and the set of spray nozzles.

3.3 Other Sensors

In one variation, the system further includes: an ambient temperature sensor; an infrared thermometer configured to read a surface temperature of the target surface; a windspeed sensor; and/or a humidity sensor; etc., such as mounted to the work platform proximal the set of spray nozzles.

4. Site Plan

During or prior to deployment of the system to a work site, the computer system can access data representing the building and generate a set of waypoints defining navigation of the system around the building during a subsequent paint application procedure.

In one implementation, the computer system accesses an aerial or satellite image—such as from an aerial mapping service—of a work site occupied by a building designated for paint application. In this implementation, the computer system then interfaces with an operator to select a set of walls of the building for paint application, such as: by enabling the operator to select walls directly from the aerial image; by recording points dropped on the image by the operator and interpolating walls between these points.

In another implementation, an operator deploys an unmanned aerial vehicle to the work site prior to or with the system. The aerial vehicle then executes an autonomous or manually-controlled flight path to navigate around the building while capturing color and/or depth images of the building. The aerial vehicle and/or the computer system then compiles these color and/or depth images into a three-dimensional model of the building and surrounding topography. The computer system then: presents the model of the building to the operator; and interfaces with the operator to select a set of walls of the building for paint application, such as by enabling the operator to select surfaces or define bounded areas (e.g., boxes) on walls represented in the model of the building.

In yet another implementation, for a newly-constructed and completed building erected at the work site, the computer system can access a virtual (e.g., CAD) three-dimensional georeferenced model of the building, such as generated by an engineer or behalf of a site manager. Alternatively, for an in-process building currently under construction at the work site, the computer system can similarly access a virtual (e.g., CAD) three-dimensional georeferenced model of the building. The computer system then: presents this virtual model of the building to the operator; and interfaces with the operator to select a set of walls of the building for paint application, such as by enabling the operator to select surfaces or define bounded areas (e.g., boxes) on walls represented in the model of the building.

In the foregoing implementations, the computer system then: scans the model of the building—including surrounding topographical features—for obstacles near the selected walls of the building, such as shrubs, utility boxes, signs, and benches; and defines a system path along the walls selected by the operator, such as nominally offset from these walls by a predefined target system offset distance (e.g., six feet) and that maintains a minimum distance (e.g., two feet) from detected obstacles. The computer system then constructs an ordered sequence of geospatially-referenced keypoints along this system path, such as offset along the system path by a target building segment width (e.g., six feet); and uploads these keypoints to the system.

Furthermore, the computer system can: extract a height of a selected wall of the building at each building segment; and annotate each keypoint with a height of the corresponding building segment. The system can then navigate the work platform and the set of spray nozzles to the height specified in a keypoint when applying paint to the corresponding building segment on the building, as described below.

Alternatively, the system can autonomously generate the system path and sequence of keypoints in real-time based on data captured by the system while applying paint to the building.

4.1 Toolpath+Raster Pattern

In one variation, the computer system can define a system path (or "toolpath") along the walls selected by the operator and then construct an ordered sequence of keypoints-representing positions of the set of spray nozzles relative to the target surface-along this system path and upload these keypoints to the system. The controller can then execute a paint application cycle and navigate the system along these keypoints of the toolpath to apply paint over a target surface.

Furthermore, the computer system can scan the model of the building and detect features (e.g., a set of doors, a set of windows, a set of segments) on a target surface of the building. The computer system can then derive target zones for application of paint onto the target surface and keepout zones to prevent application of paint onto these features (e.g., a set of doors, a set of windows, a set of segments) of the target surface. The computer system can: construct an ordered sequence of keypoints including geospatial locations, orientations, and commands for activation and/or deactivation of the set of spray nozzles upon entry into a target zone and/or a keepout zone during a paint application cycle.

For example, the computer system can access a first image (e.g., color image)—captured by the optical sensor—depicting a target surface of the building and extract a set of features from the first image. Then, based on these set of features the computer system can derive a set of keypoints, each keypoint in the set of keypoints including: a geospatial location to locate the set of spray nozzles facing the target surface; an orientation to locate a spray axis of the set of spray nozzles normal to the target surface; a first command to activate the set of spray nozzles for application of paint onto the target surface; and a second command to deactivate the set of spray nozzles to prevent application of paint onto the target surface. The computer system can then: assemble the set of keypoints into a toolpath for execution by the system and upload these keypoints to the system. The controller can then autonomously traverse the set of spray nozzles across segments of the target surface according to the toolpath.

In another variation, the computer system can receive dimensions of the building from an operator and leverage these dimensions to derive a boustrophedonic raster pattern. The computer system can then upload this boustrophedonic raster pattern to the system to execute during a paint application cycle.

For example, the computer system can: receive dimensions of the building from an operator and based on the dimensions of the building: derive a first width of the first segment of the target surface; derive a first height of the first segment of the target surface; derive a second width of a second segment of the target surface; and derive a second height of the second segment of the target surface. The computer system can then: define a first set of lateral raster legs (e.g., horizontal raster legs) based on the first width of the first segment and the second width of the second segment of the target surface; define a second set of vertical raster legs and connection the first set of raster legs based on the first height of the first segment and the second height of the second segment of the target surface; and compile the first set of lateral raster legs and the second set of vertical raster legs into a boustrophedonic raster pattern for execution by the system.

The computer system then uploads this boustrophedonic raster pattern to the system and the controller can: access the boustrophedonic raster pattern for the target surface; apply paint from the set of spray nozzles across the first segment of the target surface according to the boustrophedonic raster pattern; and apply paint from the set of spray nozzles across the second segment of the target surface according to the boustrophedonic raster pattern.

The controller can implement these methods and techniques for each other segment of the target surface and for each other target surface to complete application of paint across the building.

5. Site Setup+First Building Segment

The operator can manually deploy the system onto the work site, such as by navigating the system near a first keypoint along the system path or otherwise near a first corner of the building to face a first target zone on the first segment of the building and then verifies the target zone prior to executing a paint application cycle. Alternatively, once deployed on the work site, the system can implement autonomous navigation techniques to autonomously navigate the set of spray nozzles toward the first keypoint along the system path and execute a paint application cycle, as further described below.

5.1 Manual Site Setup: Light Projection Subsystem

In one implementation, once the operator manually deploys the system onto the work site such that the set of spray nozzles face the first target zone on the target surface and/or the first keypoint of the toolpath, the computer system can generate a prompt for the operator to verify the position of the set of spray nozzles. Then, in response to the operator's verification of the position, the controller can execute a paint application cycle for the first segment. Alternatively, in response to the operator's disapproval of the position, the controller can navigate the set of spray nozzles to a second keypoint and execute a paint application cycle for the first segment.

In one variation, the work platform includes a light projection subsystem, and the controller triggers the light projection subsystem to project reference features (e.g., a lighted box perimeter)—visible to the operator—onto the current building segment to fully bound the target zone within this segment of the building. In this variation, the controller can: scan images captured by the color camera(s) for the reference feature; and implement methods and techniques described above to define target and keepout zones—fully bounded by the reference feature—within the segment of the building segment.

For example, during a first paint cycle, the controller can: project a lighted box perimeter—visible to an operator affiliated with the building—onto a first segment of the target surface; and generate a first prompt for the operator to verify that the lighted box perimeter corresponds to a first target zone on the first segment of the target surface. Then, in response to receiving verification of the lighted box perimeter from the operator and in response to detecting the set of spray nozzles facing the lighted box perimeter on the first segment, the controller can apply paint within the lighted box perimeter (e.g., the first target zone) onto the first segment of the target surface via the set of spray nozzles. The controller can then: initiate a second paint application cycle; traverse the lighted box perimeter vertically across the second segment of the target surface; project the lighted box perimeter onto the second segment of the target surface; and generate a second prompt for the operator verify that the lighted box perimeter corresponds to a second target zone on the second segment of the target surface. Then, in response to receiving verification of the lighted box perimeter from the operator and in response to detecting the set of spray nozzles facing the lighted box perimeter on the second segment, the controller can apply paint within the lighted box perimeter (e.g., the second target zone) onto the second segment of the target surface via the set of spray nozzles.

Additionally or alternatively, in response to receiving verification of the lighted box perimeter from the operator, the controller can define paint parameters for the system prior to application of paint onto the target surface (e.g., in real time). For example, in response to receiving verification of the lighted box perimeter from the operator, the controller can: define a first standoff distance between the set of spray nozzles and the first segment of the target surface; define a first flow rate of paint through the set of spray nozzles; and define a first speed of the set of spray nozzles for application of paint onto the first segment of the target surface. The controller can then apply paint within the lighted box perimeter onto the first segment of the target surface based on the first standoff distance between the set of spray nozzles and the first segment of the target surface, the first flow rate, and the first speed.

Therefore, the operator can manually deploy the system onto the work site and responsive to the operator's verification and/or disapproval of the lighted box perimeter, the controller can define paint parameters for the system and autonomously activate the set of spray nozzles to apply paint to segments of the target surface during a paint application cycle.

5.2 Autonomous Site Setup

In one implementation, once the system occupies a first keypoint or otherwise faces the first building segment, the controller can autonomously drive the work platform upwardly to locate the top edge of the target surface within the first building segment within the spray field of the set of spray nozzles and within the field of view of the optical sensor. In one implementation, the system drives the work platform upwardly to locate the set of spray nozzles at a known peak height of the building, such as a known peak height of the building within the first building segment.

For example, during a first paint application cycle, the controller can: autonomously navigate the set of spray nozzles along the toolpath to a first target position relative a first segment of the target surface based on a first keypoint; and activate the set of spray nozzles to apply paint over the first segment of the target surface according to the toolpath.

Alternatively, the system can implement methods and techniques described below to detect and track the top edge of this first building segment in a color and/or depth image.

6. Paint Parameters

In one implementation, the computer system (or the system) retrieves a paint application specification for paint loaded into the spray system, a current configuration of the system, and/or paint application parameters for the building, such as including: a building segment width (e.g., six feet); a building segment height (e.g., four feet or full building height); a geometry (e.g., vertical and lateral spray angles) of the set of spray nozzles currently installed in the spray system; a target nozzle standoff distance range from the target surface (e.g., between eleven inches and thirteen inches); a minimal paint spray overlap (e.g., 50%); a target paint thickness; and/or a surface temperature application range for the paint; etc.

The controller (or the computer system) can also: calculate a vertical raster pitch distance (e.g., six inches) based on the nozzle spray geometry and the minimal paint spray overlap; set or calculate a target paint flow rate; and/or calculate a raster speed (e.g., two feet per second) based on the target paint thickness, the vertical raster pitch distance, the nozzle spray geometry, and the target paint flow rate. Alternatively, the controller (or the computer system) can retrieve a predefined target raster speed and/or paint flow rate associated with the set of spray nozzles.

However, the controller (or the computer system) can retrieve or calculate paint parameters for the building in any other way.

7. Paint Application

Generally, with the set of spray nozzles located within a first segment of the target surface at the top of the first building segment, the controller can execute a paint application cycle to navigate the set of spray nozzles across the first segment of the target surface and apply paint from the set of spray nozzles onto this first segment of the target surface.

More specifically, during a paint application cycle, the controller can: trigger the end effector to locate the set of spray nozzles at a first position (e.g., a top-right position within the first segment); raster the end effector across the face of the target surface within the first segment based on a set of spray parameters; capture depth images of the target surface (e.g., via the near-field depth sensor); implement closed-loop controls to maintain a pitch and yaw orientation of the set of spray nozzles and a linear standoff distance of the set of spray nozzles from the target surface within a target standoff distance range; capture color images of the target surface (e.g., via the near-field color camera); detect target and keepout zones within the first segment based on features extracted from these color images; selectively activate the spray system when the set of spray nozzles is facing target zones; and selectively deactivate the spray system when the set of spray nozzles is facing keepout zones.

7.1 Paint Application Initiation: Paint Application Cycle

The controller then manipulates the work platform and the end effector to locate the set of spray nozzles to face a target zone within the first segment of the target surface such as three inches to the left of the left edge of the segment of the building segment with the axis of the set of spray nozzles aligned with (or slightly below, such as two inches below) the top edge of the segment of the building segment.

The controller further executes a sequence of scan and paint application cycles during the paint application procedure: to raster the set of spray nozzles across the segment of the target surface; to detect and align the set of spray nozzles to reference features-defined by the projected lighted box perimeter-within a segment of the target surface and/or to a target zone within the segment of the target surface; and to selectively apply paint to these features.

7.2 Real-Time Building Feature Detection

Figure 1B:
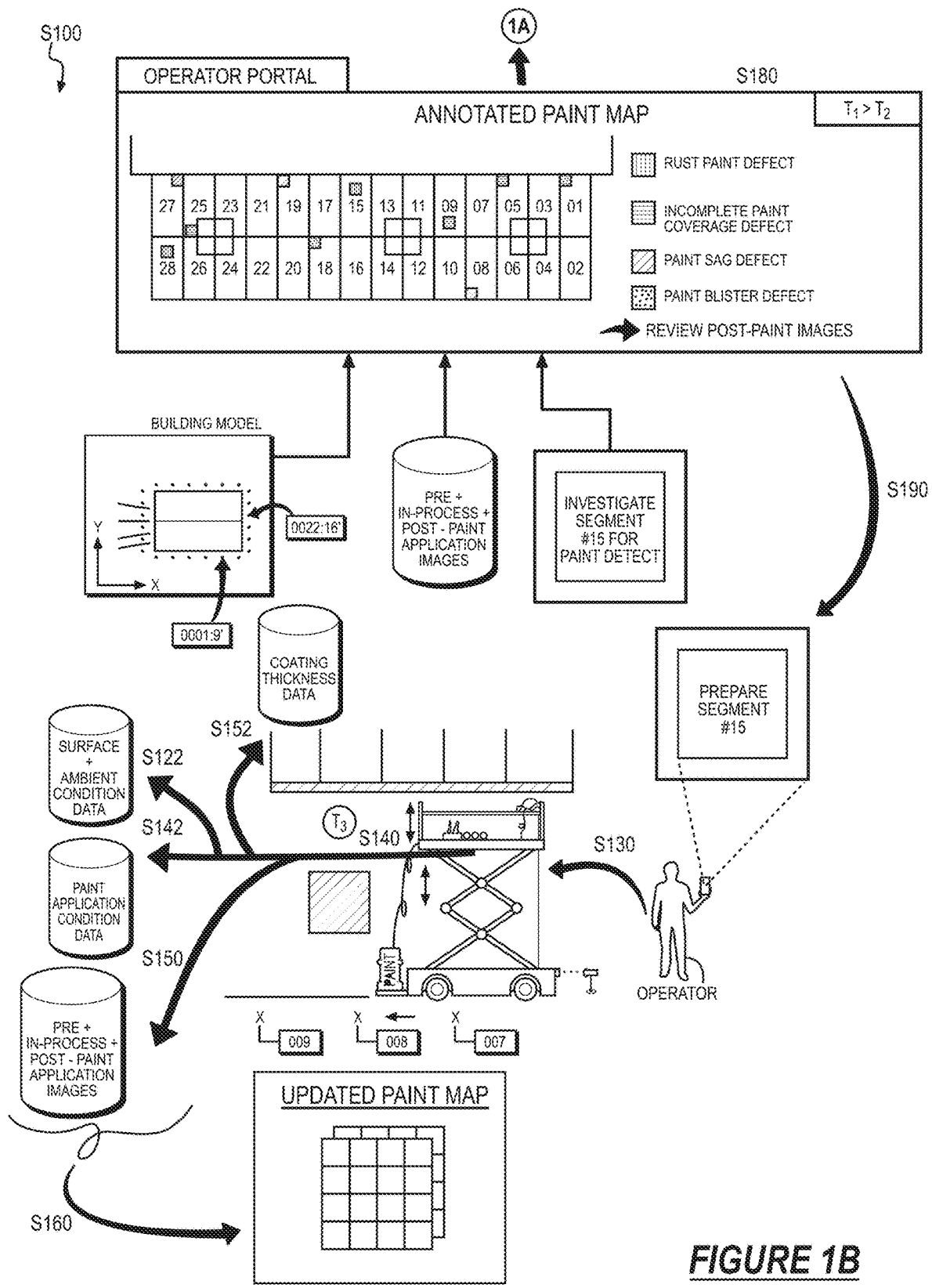
Figure 2:
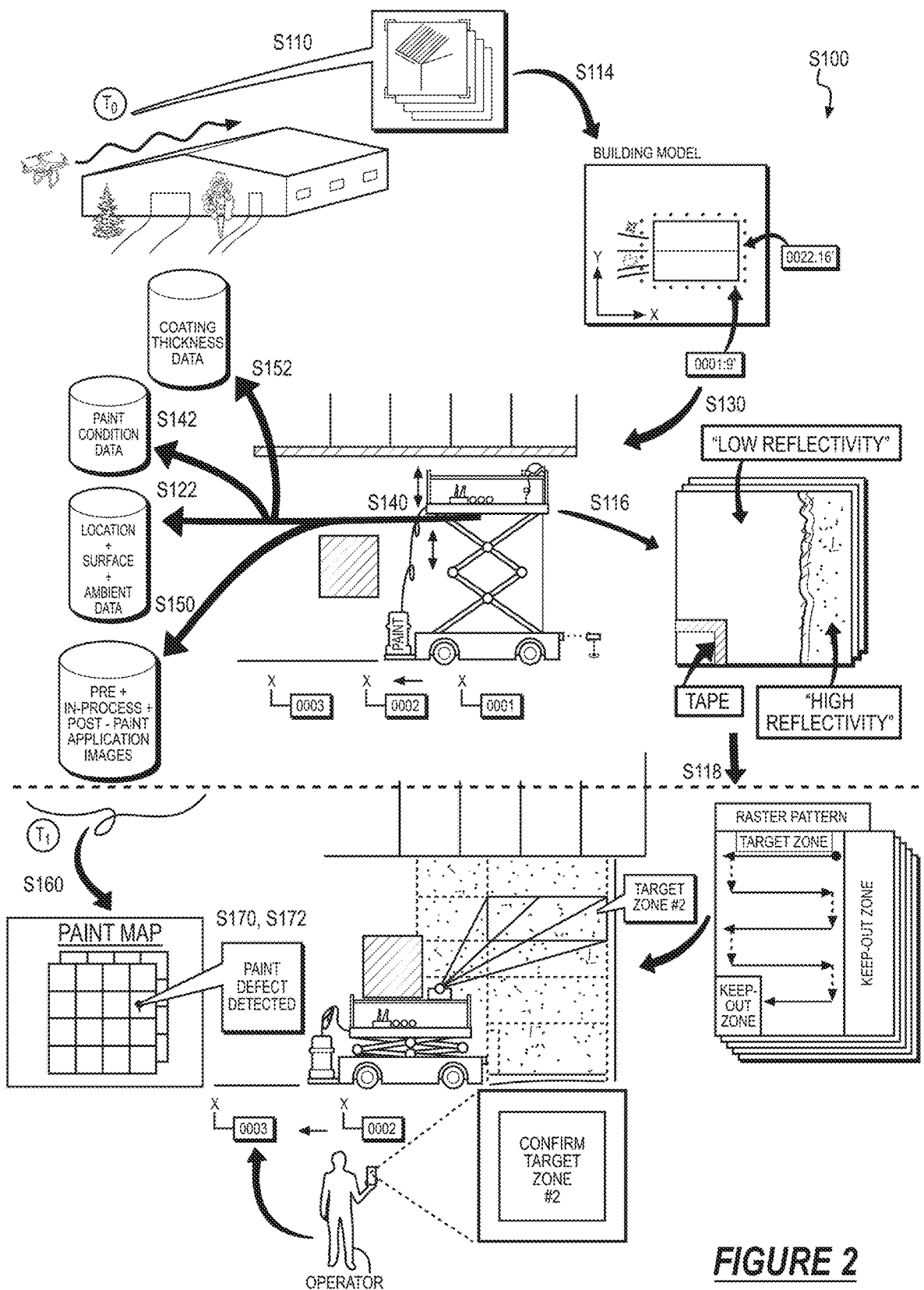
FIG. 2 is a flowchart representation of one variation of the method.

As shown in FIGS. 1A and 1B, during a scan cycle, the controller can: retrieve a current color image representing a segment of the target surface currently facing the set of spray nozzles from the nearfield color camera; detect and extract visual features (e.g., edges, masking tape) from this color image; characterize positions and geometries of target and keepout zones within this segment of the target surface currently facing the set of spray nozzles based on these visual features that represent the target surface within and around the current spray field of the set of spray nozzles.

Additionally or alternatively, during a scan cycle, the controller can: retrieve a current depth map representing this segment of the target surface currently facing the set of spray nozzles from the depth sensor; detect and extract spatial features (e.g., edges, planes) from this depth map; characterize positions and geometries of target and keepout zones within this segment of the target surface currently facing the set of spray nozzles based on these spatial features that represent the target surface within and around the current spray field of the set of spray nozzles.

In one implementation, during a scan cycle, the system can sample near-field a depth sensor on the work platform to read: a set of peripheral distances to points on a nearby surface, such as distances from the depth sensor to three or more vertically- and laterally-offset points on the nearby surface; and a center distance to a point on the nearby surface approximately centered on the axis of the set of spray nozzles. The system then implements closed-loop controls to modulate stages in the end effector to equalize the peripheral distances and to drive the center distance to the standoff distance (e.g., twelve inches). For example, during the scan cycle, at a depth sensor mounted to the spray system and adjacent the optical sensor, the controller can: receive a set of peripheral distances to points on a first segment of the target surface from the depth sensor; detect a first peripheral distance between the set of spray nozzles and the first segment of the target surface; and, in response to the first distance falling within a target standoff distance range between the set of spray nozzles and the first segment of the target surface (e.g., between eleven inches and thirteen inches), apply paint from the set of spray nozzles over the first segment of the target surface according to the toolpath.

Then or concurrently—while driving the set of spray nozzles leftward across the segment of the building segment—the controller can: access a near-field color image from the left near-field color camera; and scan the color image for features indicating the target surface, target zones, and keepout zones ahead of motion of the set of spray nozzles. For example, the system can: retrieve a color palette of the target surface, such as from the three-dimensional model of the building or aerial images of the building; isolate a first region of the color image containing color values within and near the color palette of the target surface; and identify and label the first region of the color images as representing the target surface. In this example, the system can also retrieve a color palette of a volume of paint loaded into the spray system from the, such as from the three-dimensional model of the building or aerial images of the building isolate a second region of the color image containing color values different from the color palette of the target surface; and identify and label the second region of the color images as representing a surface or volume other than the target surface.

Alternatively, while driving the set of spray nozzles leftward across the segment of the building segment—the controller can: access a near-field color image from the left near-field color camera; and scan the color image for features indicating a first volume of paint. For example, the controller can: access the paint application specification defining a color palette of the first volume of paint; scan a first image within the paint map for a set of color values analogous to the color palette of the first volume of paint; and label the first image, containing the set of color values as the first volume of paint; and annotate the first image within the paint map with the first paint thickness-predicted during the paint application cycle—corresponding to the first volume of paint.

Additionally, the system can: implement edge detection to detect edges of the building (e.g., vertical wall edges, window and door edges, horizontal soffit edges) depicted in the color image; label the first region of the color image—bounded by these edges of the building and containing color values within and near the color palette of the target surface—as the target surface; and label remaining regions of the image as other than the target surface.

Additionally or alternatively, the system can: read a concurrent depth image from the depth sensor; detect depth discontinuities in the concurrent depth image; identify a first region of the depth image containing depth values with a nominal depth range (e.g., less than six feet) as corresponding to the target surface of the building; project a first boundary of the first region, labeled as the target surface, onto the color image; and label a region of the color image outside of the first boundary as other than the target surface.

Similarly, while driving the set of spray nozzles rightward across the segment of the building segment, the controller can: access a near-field color image from the right near-field color camera; and implement similar methods and techniques to detect and annotate features near and ahead of motion of the set of spray nozzles.

7.2.1 Depth Values+Target Standoff Distance Range

In one variation, during a scan cycle, the system can sample the near-field depth sensor on the work platform to read: a center distance between the set of spray nozzles and points on a first segment of the target surface. The system then implements closed-loop controls to modulate stages in the end effector to maintain the center distance within a standoff distance range (e.g., between eleven inches and thirteen inches).

For example, during the scan cycle, at a depth sensor mounted to the spray system and adjacent the optical sensor, the controller can: receive a set of distances between the set of spray nozzles and points on a first segment of the target surface from the depth sensor; detect a center distance (e.g., twelve inches) between the set of spray nozzles and the segment of the target surface; and in response to the center distance falling within a target standoff distance range between the set of spray nozzles and the segment of the target surface (e.g., between 11 inches and 13 inches), apply paint from the set of spray nozzles over the first segment of the target surface according to the toolpath.

Alternatively, during a paint application cycle, the controller can: navigate the set of spray nozzles along the toolpath to a target position relative a first segment of the target surface based on a keypoint; and detect the center distance (e.g., ten inches) between the set of spray nozzles and the first segment of the target surface at the depth sensor. Then, in response to the center distance falling outside of the target standoff distance range between the set of spray nozzles and the first segment of the target surface (e.g., between 11 inches and 13 inches), the controller can: generate a new target position relative the first segment of the target surface to maintain the center distance within the target standoff distance range; and store this new target position in the keypoint to update the toolpath. The controller can then navigate the set of spray nozzles to this new target position relative the first segment of the target surface based on the keypoint and complete a next paint application cycle.

In another variation, the system can sample the depth sensor to access a set of depth values and interpret a set of peripheral distances between the set of spray nozzles and the first segment of the target surface. The system then implements closed-loop controls to modulate stages in the end effector to maintain the set of spray nozzles normal to the first segment of the target surface during a paint application cycle. For example, during a first paint application cycle, the system can detect a first set of depth values of the set of spray nozzles at the depth sensor mounted to the spray system and adjacent the optical sensor. The controller can then maintain the set of spray nozzles normal to the first segment of the target surface to apply paint laterally across the first segment of the target surface based on the first set of depth values. During a second paint application cycle, the system can detect a second set of depth values of the set of spray nozzles at the depth sensor. The controller can then maintain the set of spray nozzles normal to the second segment of the target surface to apply paint laterally across the second segment of the target surface based on the second set of depth values.

Therefore, the system can leverage depth values from the depth sensor to maintain a center distance between the set of spray nozzles and a segment of the target surface within a standoff distance range (e.g., between eleven inches and thirteen inches) and thereby, maintain the set of spray nozzles normal to the segment of the target surface during a paint application cycle.

7.3 Masking Tape: Target Zone+Keepout Zone

In one variation, an operator applies masking tape to regions of the target surface to define keepout zones. Accordingly, the controller can: implement edge detection and color matching techniques to identify masking tape in the current pre-paint application color image; and define a boundary between a target zone and keepout zone on the target surface along the masking tape.

For example, the system can: scan the current pre-paint application color image for pixels containing color values near a known masking tape color (e.g., blue, green); implement edge detection to detect a near-side edge of the masking tape; define the target zone extending up to the nearside edge of the masking tape; and define the keepout zone extending behind the nearside edge of the masking tape.

In one variation, the system is paired with a masking tape that includes: a first color (e.g., blue) extending along a first edge configured to face a target zone; and a first color (e.g., green) extending along a second edge configured to face a keepout zone. In this variation, the controller can: detect the masking tape in the current pre-paint application color image; detect the first and second colors of the masking tape; identify a target zone on the target surface facing the first color of the masking tape; identify a keepout zone on the target surface facing the second color of the masking tape; and label or confirm these target and keepout zones of the target surface in the color image accordingly.

For example, the controller can detect the first and second colors of the masking tape within a current pre-paint application color image depicting first and second segments of the target surface. The controller can then identify a target zone on the first segment of the target surface based on the first color (e.g., blue) and identify a keepout zone, adjacent the target zone, on the second segment of the target surface based on the second color (e.g., green). In this example, the controller can: access a first masking tape color associated with target zones (e.g., blue) and indicating activation of the set of spray nozzles to apply paint to the target surface; and access a second masking tape color associated with keepout zones (e.g., green) and indicating deactivation of the set of spray nozzles. Then, the controller can extract a set of features from a current pre-paint application color image depicting a first segment of the target surface and based on the set of features: detect the first masking tape color (e.g., blue) in the first segment of the target surface; and identify a first target zone on the first segment of the target surface facing the first masking tape color. During a first paint application cycle, the controller can activate the set of spray nozzles to apply paint within the first target zone on the first segment of the target surface. Then, based on the set of features, the controller can: detect the second masking tape color (e.g., green) in a second segment above the first segment of the target surface; and identify a first keepout zone on the second segment of the target surface based on the second masking tape color (e.g., green). During a next paint application cycle, the controller can: navigate the set of spray nozzles across second segment; and deactivate the set of spray nozzles to prevent paint application on the first keepout zone on the second segment of the target surface.

7.3.1 Masking Tape Color Database

In one variation, the controller can access a masking tape color database containing colors of masking tape annotated with a target zone or a keepout zone for the building. In particular, the controller can detect first and second colors (e.g., orange, red) of masking tape within a current pre-paint application color image based on the masking tape color database. The controller can then identify a target zone on a first segment of the target surface corresponding to the first color (e.g., purple) and identify a keepout zone on a second segment adjacent the first segment of the target surface corresponding to the second color (e.g., red).

For example, the controller can: access a masking tape color database; extract a set of features from a current pre-paint application color image depicting a first segment of the target surface. Then, based on the set of features, the controller can: detect the first masking tape color (e.g., purple), from the masking tape database, in a first segment of the target surface; and identify a target zone on the first segment of the target surface based on the first masking tape color (e.g., purple). During a first paint application cycle, the controller can: navigate the set of spray nozzles across the first segment of the target surface along the toolpath; and in response to detecting a subset of spray nozzles facing the target zone, activate the subset of spray nozzles to apply paint within the target zone on the first segment of the target surface. Then, based on the set of features, the controller can: detect a second masking tape color (e.g., red) from the masking tape color database in a second segment of the target surface; and identify a keepout zone, adjacent the target zone, on the second segment of the target surface based on the second masking tape color (e.g., red). During a second paint application cycle, the controller can: navigate the set of spray nozzles across the second segment of the target along the toolpath; and in response to detecting a spray nozzle facing the keepout zone, deactivate the spray nozzle, to prevent paint application within the keepout zone on the second segment of the target surface.

Therefore, the controller can leverage a masking tape color database to identify target and keepout zones corresponding to colors of masking tape. Accordingly, the controller can selectively activate and/or deactivate spray nozzles facing a target and/or a keepout zone.

7.4 Annotated Depth Map

Additionally or alternatively, the system can: define a target surface, a target zone, and/or a keepout zone in the depth image (e.g., rather than the concurrent color image).

7.5 Real-Time Paint Application Controls within Segment

The system can then: activate the spray system (e.g., the paint supply subsystem) in response to detecting a target zone facing the set of spray nozzles (i.e., in response to detecting a target zone within the spray field of the set of spray nozzles); and similarly deactivate the spray system in response to detecting a keepout zone facing the set of spray nozzles (i.e., in response to detecting a keepout zone within the spray field of the set of spray nozzles).

In one implementation, the system characterizes the current spray field of the set of spray nozzles (i.e., the geometry of the fan of paint output by the set of spray nozzles and intersecting the target surface under current spray conditions) based on: a current standoff distance of the set of spray nozzles from the target surface; a current orientation (e.g., angular pitch and yaw offset from an adjacent segment of the target surface) of the set of spray nozzles relative to the target surface; a geometry of the set of spray nozzles; and a current paint flow rate through the set of spray nozzles (or a spray system pressure). The system can then project the current spray field onto the current annotated color image based on a known offset between the color camera and the set of spray nozzles; and/or project the current spray field onto the current annotated depth map based on a known offset between the depth sensor and the set of spray nozzles.

Then, in response to more than a threshold proportion of the spray field—projected onto the current annotated color image (or depth map)—intersecting a target zone indicated in the color image and in response to less than a threshold proportion of the spray field intersecting a keepout zone indicated in the color image, the controller can activate the spray system to dispense paint onto the target surface. Conversely, in response to less than a threshold proportion of the spray field—projected onto the current annotated color image (or depth map)—intersecting a target zone indicated in the color image and in response to more than a threshold proportion of the spray field intersecting a keepout zone indicated in the color image, the controller can deactivate the spray system to dispense paint onto the target surface.

In one example, the set of spray nozzles is oriented on the work platform such that the spray field of the set of spray nozzles is approximately elliptical with a long elliptical axis extending vertically and a short elliptical axis extending horizontally; and paint parameters for the building specify 50% overlap between spray application paths and a set of spray nozzles with spray field height of 12 inches at the target standoff distance from the target surface. In this example, the controller can: activate the spray system if more than 40% of the height of the vertical span of the spray field intersects a target zone on the target surface and/or if more than 10% of the width of the vertical span of the spray field intersects a target zone on the target surface; and otherwise deactivate the spray system.

The computer system can repeat this process to: detect target and keepout regions ahead of the set of spray nozzles in color images captured by the near-field color cameras; maintain the set of spray nozzles normal to the surface of the building based on depth values read from the near-field depth sensor; and selectively activate the spray system while controlling the end effector and/or work platform to raster the set of spray nozzles across the segment of the building segment.

Additionally or alternatively, the computer system implements similar methods and techniques to: detect target and keepout regions ahead of the set of spray nozzles in color images captured by the far-field color camera (which may be less subject to overspray than the near-field color cameras);

maintain the set of spray nozzles normal to the surface of the building based on depth values read from the far-field depth sensor (which may be less subject to overspray than the near-field depth sensor); and selectively activate the spray system while controlling the end effector and/or work platform to raster the set of spray nozzles across the segment of the building segment.

7.6 Spray System Control Resolution

The controller can repeat the foregoing process in realtime while rastering the set of spray nozzles across the first segment of the target surface of the building.

For example, the controller can: execute one scan cycle to generate one annotated color (and/or depth) image—labeled with identified target and keepout zones—per lateral distance interval (e.g., 0.500") traversed by the set of spray nozzles; calculate and project the current spray field of the set of spray nozzles onto the current annotated color image; selectively activate or deactivate the spray system based on intersection of the projected spray field with target and keepout zones identified in the current annotated color image; maintain the current active or inactive state of the spray system as the end effector traverses the set of spray nozzles laterally across this segment of the building segment; and repeat this process once the end effector again traverses the lateral distance interval in order to achieve a horizontal paint application resolution of +/−0.25".

In another example, the controller can: execute one scan cycle to generate one annotated color (and/or depth image)—labeled with identified target and keepout zones—per lateral imaging distance interval (e.g., 1.0") traversed by the set of spray nozzles; implement dead reckoning techniques to interpolate the position of the current spray field of the set of spray nozzles relative to target and keepout zones identified in the current annotated color image based on motion of the end effector; selectively activate or deactivate the spray system based on this interpolated intersection of the projected spray field with target and keepout zones in order to achieve a greater horizontal paint application resolution (e.g., +/−0.05"); and reset and repeat this process once the end effector again traverses the lateral distance interval (e.g., 1.0").

7.7 Segment Preplanning

In one variation, prior to initiating paint application within the segment of the building segment, the controller: triggers the far-field color camera to capture one pre-paint color image of the entire segment of the building segment; triggers the far-field color camera to capture a set of color images of the entire segment of the building segment and stitches these color images into a composite pre-paint color image of the segment of the building segment; triggers the nearfield color camera to capture a sequence of images while the work platform rasters the color camera across the segment of the building segment; and then compiles these color images into a composite color pre-paint image of the segment of the building segment.

In this variation, the controller then: implements methods and techniques described above to detect and label target and keepout zones within the segment of the building segment; defines a raster pattern (or "toolpath") for the segment of the building segment based on the width of the building segment, the height of the building segment, and the vertical raster pitch distance; projects the raster pattern on the annotated color image of the segment of the building segment; calculates and projects planned spray fields of the set of spray nozzles-when subsequently traversing the raster pattern-onto the annotated color image of the segment of the building segment; detects intersections between these projected spray fields, target zones, and keepout zones identified in the color image; and inserts keypoints containing spray system activation and deactivation commands along the raster pattern based on these intersections.

The controller then: triggers the aperture(s) in the housing described above to enclose the color camera (and depth sensor, etc.) to shield the color camera from overspray; interfaces with the work platform to navigate the set of spray nozzles along the raster pattern; implements dead reckoning techniques to track the position of the set of spray nozzles along the raster pattern; and selectively activates and deactivates the spray system based on commands contained in keypoints along the raster pattern as the estimated position of the set of spray nozzles reaches these keypoints.

In one variation, the work platform includes a light projection subsystem, and the controller: triggers the light projection subsystem to project reference features (e.g., a lighted box perimeter)—visible to the operator—onto the current building segment; then triggers the optical sensor to capture an image of the building segment; detects the reference features in a particular region of the image of the building segment; and then implements the foregoing methods and techniques to detect target and keepout zones within the particular region of the image and to define a raster pattern and keypoints based on features detected within this region of the image.

8. Next Segment

Upon reaching the terminus of a raster pattern within the current segment of the building segment, the controller can manipulate the work platform, the end effector, and/or the chassis to relocate the set of spray nozzles to a target position of a next segment of the building segment, such as below the preceding segment of the building segment or above and to the left of the current segment of the building segment.

In one implementation, for the end effector that includes a vertical stage configured to move the set of spray nozzles vertically downward to traverse a segment of a building segment while the work platform remains in a fixed vertical position, the system can: move the work platform downward to face a next segment within the current building segment; complete application of paint—from top to bottom—within the current building segment; and then autonomously navigate the chassis leftward to a geospatial keypoint that locates the chassis facing a next building segment and raise the work platform and the end effector to locate the set of spray nozzles near the top of this next building segment.

Alternatively for the end effector that excludes a vertical stage and in which the work platform is configured to lower continuously from the maximum height of the building segment to the base of the building segment, the system can then autonomously navigate the chassis leftward to a geospatial keypoint that locates the chassis facing a next building segment and raise the work platform to locate the set of spray nozzles near the top of this next building segment.

In one implementation, the controller implements geospatial triangulation and closed-loop controls to autonomously navigate the chassis from the current geospatial keypoint to the next geospatial keypoint.

In another implementation, the operator places wireless transmitters on or near the building prior to the paint application procedure. In this implementation, the controller: queries these wireless transmitters; implements triangulation techniques to track the position of the system relative to these wireless transmitters based on signals received from these wireless transmitters; and implements closed-loop controls to autonomously navigate the chassis from its current position facing the first building segment to a next position facing the second building segment based on the position of the system relative to these wireless transmitters.

In a similar implementation, the system includes a set of optical detectors, and the operator places optical emitters (e.g., laser references) at opposing ends of a wall of the building prior to the paint application procedure, such as offset from the wall of the building by a target offset distance (e.g., six feet). In this implementation, the controller: samples the optical detectors to detect light from the optical emitters; tracks the position of the system relative to these optical emitters at the ends of this wall based on light detected by the optical detects; implements closed-loop controls to autonomously navigate the chassis from its current position facing the first building segment to a next position facing the second building segment based on the position of the system relative to these optical emitters; and implements closed-loop controls to autonomously maintain the centerline (or other axis) of the chassis centered along light beams output by the optical emitters while navigating the chassis between building segments on the building.

Additionally or alternatively, the controller can: track an offset distance between the chassis and the wall of the building based on depth maps read from depth sensors mounted to the chassis, the work platform, and/or the end effector; and implement closed-loop controls to maintain this offset distance between the chassis and the wall while navigating the system between building segments based on distance values contained in depth maps read from these depth sensors.

In the foregoing implementation, the controller can also: capture color images and/or depth maps of a field around the system; and implement object avoidance techniques to avoid collision with objects and surfaces detected in these color images and/or depth maps.

8.1 Object Proximity Alarms

Figure 4:
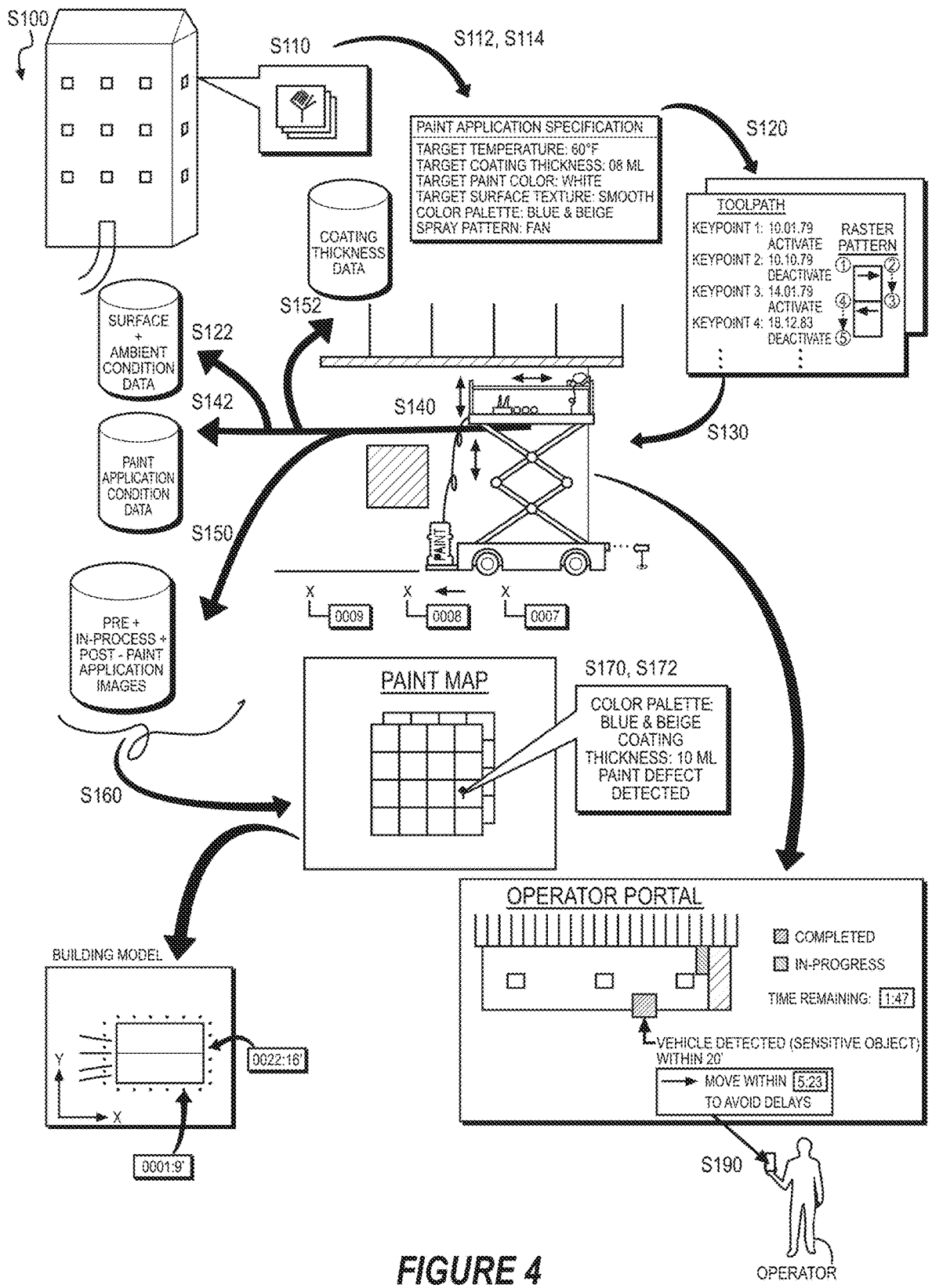
FIG. 4 is a flowchart representation of one variation of the method.

Furthermore, the controller can: implement object recognition, perception, artificial intelligence, and/or other computer vision techniques to identify types of objects in the field around the system and distance between the system and these objects based on features detected in the color images and/or depth maps; and generate alerts or prompts to redistribute these objects within the work site, such as to reduce risk of overspray on these objects, as shown in FIG. 4.

In one implementation, the controller (or the computer system) can set a threshold overspray distance, such as: proportional to current detected or peak local windspeed; or proportional to the maximum height of the building or a remaining segment of the building to be painted. The controller can also: retrieve a list of sensitive objects, such as cars, trucks, motorcycles, bicycles, trailers, signs, and people; and implement object recognition techniques to detect presence of such sensitive objects around the system and distances between these objects and the system.

In this implementation, in response to detecting a sensitive object within the threshold overspray distance, the controller can: pause the paint application procedure; generate an alarm and notification to relocate the sensitive object away from the system; transmit the notification to the operator and/or to a building associate affiliated with the building or work site; and then resume the paint process once the sensitive object is no longer within the threshold overspray distance of the system or once the operator or building associate manually clears the alarm.

For example, the controller can: set a threshold overspray distance—proportional to the first height of a first segment of the target surface (e.g., a four-foot-tall segment)—between the set of spray nozzles and the target surface; and retrieve a list of sensitive objects associated with the building, such as such as cars, trucks, motorcycles, bicycles, trailers, signs, and people. Then, during a paint application cycle for the first segment of the target surface, the controller can: detect a sensitive object (e.g., a car), from the list of sensitive objects, within the threshold overspray distance of the first segment of the target surface based on the a color image captured by the optical sensor; and, in response to detecting the sensitive object within the threshold overspray distance, generate an alarm notifying the operator to remove the sensitive object (e.g., a car). Then, in response to the operator manually clearing the alarm, the controller can navigate the set of spray nozzles along the toolpath to a next target position relative a next segment of the target surface based on a second keypoint contained in the toolpath and execute a paint application cycle for this next segment of the target surface.

Additionally or alternatively, in this implementation, while rastering the set of spray nozzles across a first segment of the building, the controller can scan the field around the system for sensitive objects not currently within the threshold overspray distance of the system, but that will fall within the threshold overspray distance once the system moves to a next building segment. Then, in response to detecting a sensitive object that will fall within the threshold overspray distance once the system moves to a next building segment, the controller can: predict a target time at which the system will complete application of paint on the current building segment, such as based on the width and height of the building segment, the vertical raster pitch distance, and the current raster speed of the set of spray nozzles; generate a notification to relocate the sensitive object away from the system before the target time in order to avoid disruption to the paint application procedure; transmit the notification to the operator and/or to the building associate; and initiate paint application on the next building segment only upon confirming absence of sensitive objects within the threshold overspray distance of the system or only once the operator or building associate manually confirms paint application on the next building segment.

In this implementation, the controller can implement similar methods and techniques to: detect other sensitive objects that will fall within the threshold overspray distance of the system when the system navigates to future building segments; predict target times at which the system will complete application of paint on preceding building segments and navigate to these next building segments; and prompt the operator and/or the building associate to relocate the sensitive objects before their corresponding target times in order to avoid disruption to the paint application procedure. For example, the controller (or the computer system) can retrieve or generate a map of the work site (e.g., generated by the aerial vehicle deployed on the site, generated from optical data captured by the system) or color images captured by the system; and annotate the map and/or these color images with locations of sensitive objects and their target times for relocation to avoid disruption to the paint application procedure.

9. Paint Application Data

Generally, the controller and the computer system cooperate to capture visual and non-visual paint application data across segments of the target surface of the building and to compile these data into a paint map.

More specifically, during a scan cycle, the controller can: capture an initial sequence of images depicting a target surface of the building; and access a spray pattern of a spray nozzle coupled to the spray system. Then, during a paint application cycle: the controller can detect a first set of ambient conditions of the target surface; navigate the spray system along a toolpath to apply a first volume of paint from the spray nozzle over the target surface; predict a first paint thickness of the first volume of paint of the target surface based on the spray pattern; and capture a first sequence of images depicting the first volume of paint of the target surface. The computer system and/or the controller can then aggregate the initial sequence of images, the first sequence of images, the first set of ambient conditions, and the first paint thickness into a paint map of the building.

9.1 Paint Map: Visual Data

In one implementation, during or after the paint application cycle, the computer system (or the controller) can: initialize a paint map of the building; and assemble color and/or depth images captured by the system during the paint application procedure into visual pre-paint application, in-process, and/or post-paint application layers within the paint map.

More specifically, during the paint application procedure the controller can capture pre-paint application images, such as: far-field images of segment of the building segment prior to applying paint across the segment of the building segment; near-field images of segment of the building segment while the work platform rasters the near-field camera across the segment of the building segment prior to applying paint to the surface; and/or near-field images captured by the left near-field camera while the work platform moves the set of spray nozzles leftward across the segment of the building segment and near-field images captured by the right near-field camera while the work platform moves the set of spray nozzles rightward across the segment of the building segment during application of paint onto the target surface. Similarly, the controller can capture in-process images including: near-field images captured by the left near-field camera while the work platform moves the set of spray nozzles rightward across the segment of the building segment and near-field images captured by the right near-field camera while the work platform moves the set of spray nozzles leftward across the segment of the building segment during application of paint onto the target surface. Furthermore, the controller can capture post-paint application images including: far-field images of the segment of the building segment after applying paint across the segment of the building segment; near-field images of the segment of the building segment while the work platform rasters the near-field camera across the segment of the building segment after completion application of paint across the segment of the building segment; and/or near-field images captured by the left near-field camera while the work platform moves the set of spray nozzles rightward across the segment of the building segment and near-field images captured by the right near-field camera while the work platform moves the set of spray nozzles leftward across the segment of the building segment during application of paint onto the target surface.

Accordingly, the computer system (or the controller) can: stitch these pre-paint application images into a composite (e.g., panoramic) pre-paint application image of the building and store this composite pre-paint application image in a pre-paint application layer of the paint map; stitch these in-process images into a composite (e.g., panoramic) in-process image of the building and store this composite in-process image in an in-process layer of the paint map; and/or stitch the post-paint application images into a composite (e.g., panoramic) post-paint application image of the building and store this composite post-paint application image in a pre-paint application layer of the paint map.

In the variation described above, in which the system captures depth maps of the building via the depth sensor, the computer system can further assemble these depth maps into a three-dimensional model of the building.

Alternatively, in the variation described in which the computer system accesses a three-dimensional model of the building, such as based on data captured by an aerial vehicle deployed to the work site, the computer system can: overlay the foregoing pre-paint application, in-process, and post-paint application layers onto the building model; and enable the operator to virtually navigate between regions of the building model and selectively activate these layers to view pre-paint application, in-process, and post-paint application imagery of these building regions. For example, the computer system and/or controller can: access the three-dimensional model of the building; compile the initial sequence of images into a pre-paint application composite image of the target surface; compile the first sequence of images into a post-paint application composite image of the target surface; project the pre-paint application composite image of the target surface onto the three-dimensional model of the building; project the post-paint composite image of the target surface onto the three-dimensional model of the building; and annotate the pre-paint application composite image and the post-paint composite image with the first set of ambient conditions and the first paint thickness within the three-dimensional model of the building.

Additionally or alternatively, in this variation, the computer system can: link individual pixels in the building model to sets of post-paint application color images that depict areas on the building corresponding to these individual pixels; store this annotated building model as the paint map; and enable the operator to virtually navigate between regions of the building model and select individual pixels within the building model to access pre-paint application, in-process, and/or post-paint application images of corresponding areas of the building.

9.2 Paint Map: Ambient and Surface Data

Generally, during application of paint onto the target surface of the building, the controller can sample and record surface temperatures of the target surface, ambient air temperature, ambient humidity, and/or wind speed, such as at a rate of 2 Hz. Accordingly, the computer system and/or the controller can annotate the paint map with these ambient and surface data.

In one implementation, the controller: implements dead reckoning, structure from motion, visual odometry, and/or other techniques to track the field of view of the infrared thermometer across the target surface; reads surface temperatures across the target surface—such as just before application of paint—from the infrared thermometer; and stores surface temperature readings with concurrent positions on the target surface. The computer system (or the controller) can then annotate discrete positions within the paint map with their corresponding surface temperatures just before application of paint on the target surface, such as in real-time.

For example, the controller can: detect ambient conditions of each segment of the target surface and then aggregate these ambient conditions into the paint map. During a first paint application cycle, the controller can: detect a first surface temperature of the first segment of the target surface;

and record a first humidity condition of air proximal the first segment of the target surface. During a second paint application cycle, the controller can: detect a second surface temperature of the second segment of the target surface; and record a second humidity condition of air relative the second segment of the target surface. Then, the controller can aggregate the first surface temperature, the second surface temperature, the first humidity condition, and the second humidity condition into the paint map and annotate each segment within the paint map with these ambient conditions before application of paint on the target surface (e.g., in real-time).

In another implementation, the controller and the computer system can similarly cooperate to annotate discrete positions within the paint map with ambient (e.g., air temperature, humidity, wind speed) data read from these sensors when the spray field of the set of spray nozzles intersected corresponding positions on the target surface. For example, when configured to raster the set of spray nozzles-defining a one-inch-wide and twelve-inch-tall spray field-across the target surface at a rate of two feet per second with 50% overlap between horizontal raster legs and when the configured to sample these ambient and surface sensors at 2 Hz, the computer system (or the controller) can annotate each discrete region of the paint map that represents discrete six-inch-tall, twelve-inch wide zones on the target surface with corresponding ambient and surface values.

However, the controller and the computer system can cooperate to capture and store ambient and surface data in any other resolution within the paint map.

9.3 Paint Map: Paint Thickness

Similarly, during application of paint onto the target surface of the building segment, the controller can: record paint application data; estimate applied (wet) paint thickness on the target surface based on these paint application data; and label regions of the paint map with applied (wet) paint thickness estimated for corresponding zones of the target surface.

In one implementation, during each sampling interval during application of paint onto the target surface, the controller can: read a paint flow rate from the spray system; implement dead reckoning, visual odometry, geospatial positioning, and/or other techniques to calculate a position of the set of spray nozzles relative to the building (e.g., within a coordinate system of the building); and store the current paint flow rate and the corresponding position of the set of spray nozzles relative to the building. During or upon completion of paint application on the building, the computer system can compile these paint flow rate and position data into predicted paint thicknesses across the target surface of the building.

In particular, for each paint flow rate and concurrent spray nozzle position pair recorded by the controller, the computer system can: calculate a spray field geometry of the set of spray nozzles based on this paint flow rate and the set of spray nozzles geometry; calculate a paint area on the building visible to the set of spray nozzles when occupying this spray nozzle position based on this spray field geometry; and estimate an instantaneous thickness of paint applied to this paint area on the building based on this paint flow rate.

For example, the controller can: record a first paint flow rate of paint through the set of spray nozzles; detect a first distance between the set of spray nozzles and the first segment of the target surface; transform the first paint flow rate and the first distance into a width of a spray field of the set of spray nozzles at the first segment of the target surface; detect a first speed of the set of spray nozzles applying paint across the first segment of the target surface; convert the first speed of the set of spray nozzles and the width of the spray field into a paint application rate representing paint applied within the first target zone on the first segment of the target surface; and generate a first paint thickness of paint applied on the first segment of the target surface based on a combination of the paint application rate and the first speed of the first spray nozzle (e.g., dividing the paint application rate by the first speed of the first spray nozzle).

In this implementation, the computer system can also: interpolate between these corresponding paint areas to derive interpolated paint areas; and interpolate between these instantaneous thicknesses of applied paint to derive interpolated instantaneous thicknesses of paint applied within these interpolated paint areas. The computer system can then: combine (e.g., sum, integrate) these estimated and interpolated instantaneous thicknesses of applied paint within overlapping paint areas across the target surface of the building to estimate total thickness of paint applied to each discrete (e.g., one-inch-square) area of the target surface of the building; and store these estimated total thicknesses of applied paint onto the paint map, such as a paint thickness layer aligned with the target surface depicted in the post-paint application layer of the paint map.

In one variation, the computer system further corrects estimated instantaneous thicknesses of applied paint based on local concurrent wind speeds detected by the system. In particular, high wind speeds around the set of spray nozzles may decrease a ratio of paint exiting the set of spray nozzles to paint accumulating on the target surface. Accordingly, the computer system can reduce an estimated instantaneous thickness of paint applied within a paint area on the building proportional to wind speed detected by the system when the set of spray nozzles face this paint area.

Additionally or alternatively, the computer system can implement a non-uniform spray nozzle spray pattern to estimate instantaneous thicknesses of paint applied within a paint area. In particular, the set of spray nozzles may project paint in a non-uniform pattern with greatest paint thickness applied coaxially within the set of spray nozzles (e.g., near a center of the spray field) and least paint thickness near a periphery of the spray field. Accordingly, the computer system can: retrieve a predefined spray pattern for the set of spray nozzles; and adjust, correct, or calculate an instantaneous thickness of paint applied within a paint area based on this spray pattern.

9.4 Paint Application Verification

In one variation, the computer system (or the controller) further: characterizes differences (e.g., reflectivity, color intensity) between color (or multispectral) values of pixels in the post-paint application layer of the paint map and corresponding pixels (i.e., pixels that represent the same physical areas on the building) in the pre-paint application layer of the paint map; flags a subset of post-paint application pixels that exhibit less than a threshold difference from corresponding pre-paint application pixels; and flags regions across the building corresponding to these pixels as likely exhibiting insufficient paint application.

Furthermore, the computer system can: identify a first subset of pixels—contained within target regions represented in the paint map—that exhibit less than a threshold difference between pre- and post-paint application values; predict insufficient paint coverage in the corresponding areas of the building (e.g., due to insufficient change in the color and reflectivity of the building after application of paint); flag corresponding regions of the paint map for further inspection for incomplete paint coverage; and serve the paint map with prompts to review these flagged regions to the operator.

For example, the computer system can: extract an initial set of color values from an initial image—depicting a target surface of the building—from the pre-paint application layer of the paint map; extract a first set of color values from a first image—depicting a coat of paint on the target surface—from the post-paint application layer of the paint map; and characterize a difference between the initial set of color values and the first set of color values. Then, in response to the difference falling below a threshold color difference, the computer system can: flag each segment of the target surface-depicted in the initial image and the first image-within the paint map for incomplete paint coverage; and serve the paint map with prompts to review these flagged segments of the target surface to the operator and/or to the building associate.

In this variation, the controller and/or the computer system can also execute the process in real-time to: scan a current pre-paint application image captured by the system during the paint application procedure for a first region that exhibits more than the threshold color (e.g., reflectivity, color intensity) difference from a second, known uncoated region of the building; identify the first region as containing sufficient paint thickness; define a keepout zone around the first region in order to prevent application of excess paint that may result in paint sags on this area of the building segment; define a target zone intersection the second region; and implement methods and techniques described above to selectively apply paint within an area of the building segment corresponding to the second region.

9.5 Real-Time v. Post-Hoc Paint Map

In one implementation, the system: executes the foregoing methods and techniques to capture paint application, ambient, and surface data for the building while autonomously applying paint to the building; and offloads (e.g., streams) these data to the computer system, such as during or following completion of this paint application procedure. The computer system then executes the foregoing methods and techniques to generate the paint map following completion of the paint application procedure.

Conversely, the controller and/or the computer system can execute this process in real-time to generate and develop the paint map during this paint application procedure. In this variation, the controller and/or the computer system can selectively pause the paint application procedure, generate an inspection prompt, and serve this inspection prompt to the operator in near real-time, such as in response to: estimated applied paint thicknesses deviating from the target paint thickness; surface temperatures on the building falling outside of a surface temperature application range specified for the paint; and/or local wind speeds exceeding a threshold wind speed.

For example, the controller and/or the computer system can serve a prompt to the operator in near real-time in response to such conditions and only resume the paint application procedure once confirmed by the operator.

10. Paint Thickness Closed-Loop Controls

In one variation, the computer system and the controller implement methods and techniques described above to estimate real-time paint thickness of paint applied to the target surface of the building; and implement closed-loop controls to adjust paint application parameters (e.g., paint flow rate through the spray system, spray nozzle raster speed) to reduce a difference between the estimated and target paint thicknesses. For example, the controller can: decrease traversal speed of the set of spray nozzles and/or increase flow rate through the spray system in response to a last estimated paint thickness of paint applied to the building falling below the target paint thickness; and vice versa.

For example, the computer system can: access the paint application specification defining a target paint thickness for segments of the target surface; extract a set of paint conditions including a paint thickness of a first segment of the target surface from the paint map and a first paint flow rate of the first volume of paint exiting from the set of spray nozzles; and calculate a difference between the paint thickness and the target paint thickness. Then, in response to the difference between the paint thickness and the target paint thickness falling below a threshold difference, the controller can: increase a target flow rate for a second volume of paint exiting the set of spray nozzles of the spray system; initiate a second paint application cycle at the target flow rate; and navigate the system along the toolpath to apply the second volume of paint from the set of spray nozzles over the target surface at the target flow rate.

11. Defect Detection+Operator Tools+Inspection Annotation

In one implementation, the computer system can access the paint application specification defining a set of target conditions of paint for the target surface and a spray pattern for the set of spray nozzles. The computer system can then: detect surface discontinuities on segments of the target surface based on features extracted from the paint map; leverage secondary data (e.g., paint application conditions, ambient and surface conditions, paint thicknesses) to identify these surface discontinuities as paint defects; annotate these segments within the paint map for defect inspection; and serve the annotated paint map to the operator—such as through an operator portal or a computing device (e.g., a mobile device, a tablet)—for defect inspection of these segments virtually through the paint map and/or in-person at the work site.

In one variation, the computer system can: extract a first set of features corresponding to a first segment of the target surface from the paint map; detect presence of a defect on the first segment of the target surface based on these features; and annotate the pant map to indicate presence of the defect. The computer system can then repeat these methods and techniques for a second segment of the target surface; and in response to a second set of features corresponding to the second segment of the target surface, falling within a threshold deviation range of the first set of features, detect absence of the defect on the second segment of the target surface. The computer system can then annotate the paint map to indicate absence of the defect on the second segment of the target surface.

Additionally or alternatively, the computer system can serve the annotated paint map and/or paint application layers to the operator via a computing device (e.g., a tablet, a mobile device) thereby enabling the operator to immediately review color image data of all flagged segments for defect inspection on the building.

11.1 Variation: Incomplete Coverage+Paint Sag Defect Detection

In one variation shown in FIG. 1B, the computer system: flags regions in the paint map annotated with estimated (wet) paint thicknesses significantly less than the target paint thickness for targeted incomplete coverage inspections; and flags regions in the paint map annotated with estimated (wet) paint thicknesses significantly greater than the target paint thickness for paint as paint sag defect inspections.

In one implementation, the computer system divides the paint map into segments representing one-foot-square areas on the target surface of the building. For a first segment of the paint map, the computer system: calculates a maximum absolute deviation of estimated (wet) paint thicknesses within the first segment from the target paint thickness for the building; flags (e.g., annotates, highlights) the first segment in the paint map for incomplete coverage inspection if this maximum absolute deviation falls below the target paint thickness for the building by more than a threshold coverage deviation (e.g., 25%); and flags the first segment in the paint map for sag inspection if this maximum absolute deviation exceeds the target paint thickness for the building by more than the threshold sag deviation (e.g., 15%). The computer system repeats this process for each other segment of the paint map and then presents this annotated paint map to an operator with a prompt to selectively inspect each area of the building flagged in the paint map.

For example, the computer system can: flag segments in the post-paint application layer of the paint map for incomplete paint coverage inspection; and serve this post-paint application layer to the operator via a mobile device (e.g., a tablet), thereby enabling the operator to immediately review color image data of all flagged incomplete paint coverage defects on the building. In this example, the computer system can: access the paint application specification defining a target paint thickness for paint on the target surface; and extract a first paint thickness exhibited by a first segment of the target surface from the paint map. Then, in response to the first paint thickness falling below a threshold coverage deviation (e.g., 25%) of the target paint thickness, the computer system can: identify the first segment within the paint map as an incomplete coverage defect; flag the first segment within the paint map for incomplete coverage inspection; generate a prompt for incomplete coverage inspection of first segment of the target surface; and serve the paint map and the prompt to an operator.

Alternatively, the computer system can: flag segments in the post-paint application layer of the paint map for paint sag inspection; and serve this post-paint application layer to the operator via the mobile device (e.g., a tablet, a computing device) thereby enabling the operator to immediately review color image data of all flagged paint sag defects on the building. In this example, the computer system can similarly access the target paint thickness and extract a first paint thickness exhibited by the first segment of the target surface. Then, in response to the first paint thickness exceeding a threshold coverage deviation (e.g., 25%) of the target paint thickness, the computer system can: identify the first segment within the paint map as a paint sag defect; flag the first segment within the paint map for paint sag inspection; generate a prompt for paint sag inspection of the first segment of the target surface of the building; and serve the paint map and the prompt to an operator (e.g., via the operator portal).

Additionally, the computer system can: retrieve a post-paint application color image—captured by the system—corresponding to each flagged segment in the paint map; label these post-paint application color images with their locations on the building and/or whether these images depict predicted incomplete coverage or paint sags; and serve these post-paint application color images to the operator for remote inspection of the building.

In another implementation, the computer system: divides the paint map into segments representing one-foot-square areas on the target surface of the building; calculates a maximum absolute deviation of estimated (wet) paint thicknesses within each segment from the target paint thickness for the building; generates an inspection heatmap of the target surface of the building (e.g., a heatmap layer of the paint map) based on the maximum absolute deviation calculated for each segment of the paint map; and then presents this heatmap to the operator with a prompt to prioritize inspection regions of the building based on intensity in corresponding segments of the heatmap. Additionally or alternatively, in this implementation, the computer system can: retrieve a post-paint application color image—captured by the system—corresponding to each segment in the paint map; sort these post-paint application color images by absolute deviation from the target paint thickness for the building; and serve these sorted post-paint application color images to the operator for remote manual inspection of the building.

In yet another implementation, the computer system can: access a spray pattern of the first spray nozzle. Then, during a first paint application cycle, the computer system can predict a first paint thickness of paint applied to the first segment of the target surface based on the spray pattern of the first spray nozzle. The computer system can then: access a paint application specification defining a target paint thickness for application of paint on the target surface; detect a first surface discontinuity on the first segment of the target surface within the paint map; and, in response to detecting the first surface discontinuity and in response to the first paint thickness exceeding the target paint thickness, detect presence of a sag defect on the first segment of the target surface. The computer system can then: annotate the paint map to indicate the sag defect; generate a prompt to repair the sag defect on the first segment of the target surface; and serve the paint map with the prompt to the operator for inspection of the sag defect.

Additionally or alternatively, the computer system can: isolate a first edge extending toward a lower bound of the first segment of the target surface within the paint map; isolate a second edge coupled to the first edge and extending toward the lower bound of the first segment of the target surface; detect a first linear surface discontinuity on the first segment of the target surface within the paint map based on the first edge and the second edge; and, in response to detecting the first linear surface discontinuity and in response to the first paint thickness exceeding the target paint thickness, detect presence of a sag defect on the first segment of the target surface.

Therefore, the computer system can enable the operator to: review and inspect the building remotely; and/or review flagged regions for incomplete paint coverage defects and/or paint sag defects across the building remotely prior to in-person manual review of the most problematic or indiscernible regions.

11.1.1 Variation: Paint Quality

In one variation, the computer system can: detect ambient conditions during a paint application cycle; predict a paint quality of paint applied onto the target surface based on these ambient conditions and a paint thickness of the paint; flag regions of the paint map corresponding to segments of the building exhibiting a paint quality differing from a target paint quality for the target surface; and generate a prompt for the operator to review these segments of the paint map and/or inspect corresponding segments of the building for incomplete coverage defect inspection.

For example, the computer system can: access a spray pattern of the first spray nozzle; detect a first ambient air temperature proximal the first segment of the target surface; detect a first surface temperature of the first segment of the target surface; predict a first paint thickness of paint applied to the first segment of the target surface based on the spray pattern of the first spray nozzle; and predict a first paint quality of paint applied onto the first segment of the target surface based on the first paint thickness, the first ambient air temperature, and the first surface temperature. The computer system can then: access a paint application specification defining a target paint quality for the target surface; detect a first surface discontinuity on the first segment of the target surface within the paint map; in response to detecting the first surface discontinuity and in response to the first paint quality falling below the target paint quality, detect presence of an incomplete coverage defect on the first segment of the target surface; and annotate the paint map to indicate the incomplete coverage defect.

Therefore, the computer system can leverage ambient conditions and paint thickness to predict a quality of paint applied onto the target surface and flag regions of the paint map exhibiting a paint quality differing from a target paint quality. The computer system can also enable an operator to review these flagged regions for incomplete paint coverage defects.

11.2 Variation: Blistering Paint Defect Detection+Correction

In one variation, the computer system (or the controller) similarly: flags or highlights regions of the paint map corresponding to out-of-range surface and ambient conditions; and prompts the operator to selectively review corresponding areas on the building, such as virtually through the paint map or in-person at the work site.

For example, the computer system can: flag regions of the paint map corresponding to areas of the building facing the set of spray nozzles when local wind speed—detected by the system—exceeded a threshold windspeed; and generate a prompt for the operator to review these regions of the paint map and/or inspect corresponding areas of the building for incomplete coverage.

In another variation, the computer system can: flag regions of the paint map corresponding to areas of the building exhibiting surface temperatures exceeding a manufacturer temperature specification for the paint when facing the set of spray nozzles; and generate a prompt for the operator to review these regions of the paint map and/or inspect corresponding areas of the building for incomplete paint adhesion or blistering.

For example, during a first paint application cycle the computer system can: detect a first surface temperature of paint applied on the first segment of the target surface; and access a paint application specification defining a target surface temperature for application of paint; and detect a first circular surface discontinuity on the first segment of the target surface within the paint map. Then, in response to detecting the first circular surface discontinuity and in response to the first surface temperature exceeding the target surface temperature, the computer system can detect presence of a paint blister defect on the first segment of the target surface. The computer system can then: annotate the paint map to indicate the paint blister defect; generate a prompt to repair the paint blister defect on the first segment of the target surface; and serve the paint map and the prompt to the operator for repair of the paint blister defect prior to a scheduled inspection period for the first paint application cycle. Then, in response to receiving confirmation of removal of the paint blister defect from on the first segment of the target surface from the operator, the controller can initiate a second paint application cycle for the first segment of the target surface.

In yet another variation, the computer system can: flag regions of the paint map corresponding to areas of the building exhibiting surface temperatures below a manufacturer temperature specification for the paint when facing the set of spray nozzles; and generate a prompt for the operator to review these regions of the paint map and/or inspect corresponding areas of the building for incomplete drying and cracking.

11.3 Variation: Rust Defect Detection+Correction

In one variation, the computer system can: flag regions of the paint map corresponding to segments of the building exhibiting a color of paint deviating from a target color of paint; and generate a prompt for the operator to review these segments of the paint map and/or inspect corresponding segments of the building for paint rust inspection.

For example, the computer system can: isolate an image (e.g., a post-paint application image) depicting a first segment of the target surface within the paint map; and based on features extracted from the image, detect a color of paint (e.g., beige) on the segment; and access the paint application specification defining a target color of paint (e.g., white) for the first segment of the target surface. Then, in response to the color of paint (e.g., beige) deviating from the target color of paint (e.g., white) on the first segment of the target surface, the computer system can: identify the first segment within the paint map as a rust paint defect; and flag the paint map with this rust defect.

In another example, the computer system can: access a paint application specification defining a target color value for application of paint on the target surface; detect a first color value of paint applied to the first segment of the target surface within the paint map; retrieve a set of paint defect images from a template defect image database, each paint defect image in the set of defect images labeled with a defect type, a defect score, and a paint application procedure; and extract a second set of features from a first paint defect image, in the set of paint defect images, labeled with a rust defect type, a rust repair procedure, and a first defect score. Then, in response to identifying the first set of features analogous to the second set of features and in response to the first color value falling within a threshold color deviation of the target color value, the computer system can detect presence of a rust defect on the first segment of the target surface and annotate the paint map to indicate the rust defect.

12. Template Defect Image Database: Defect Detection+Correction

Figure 3:
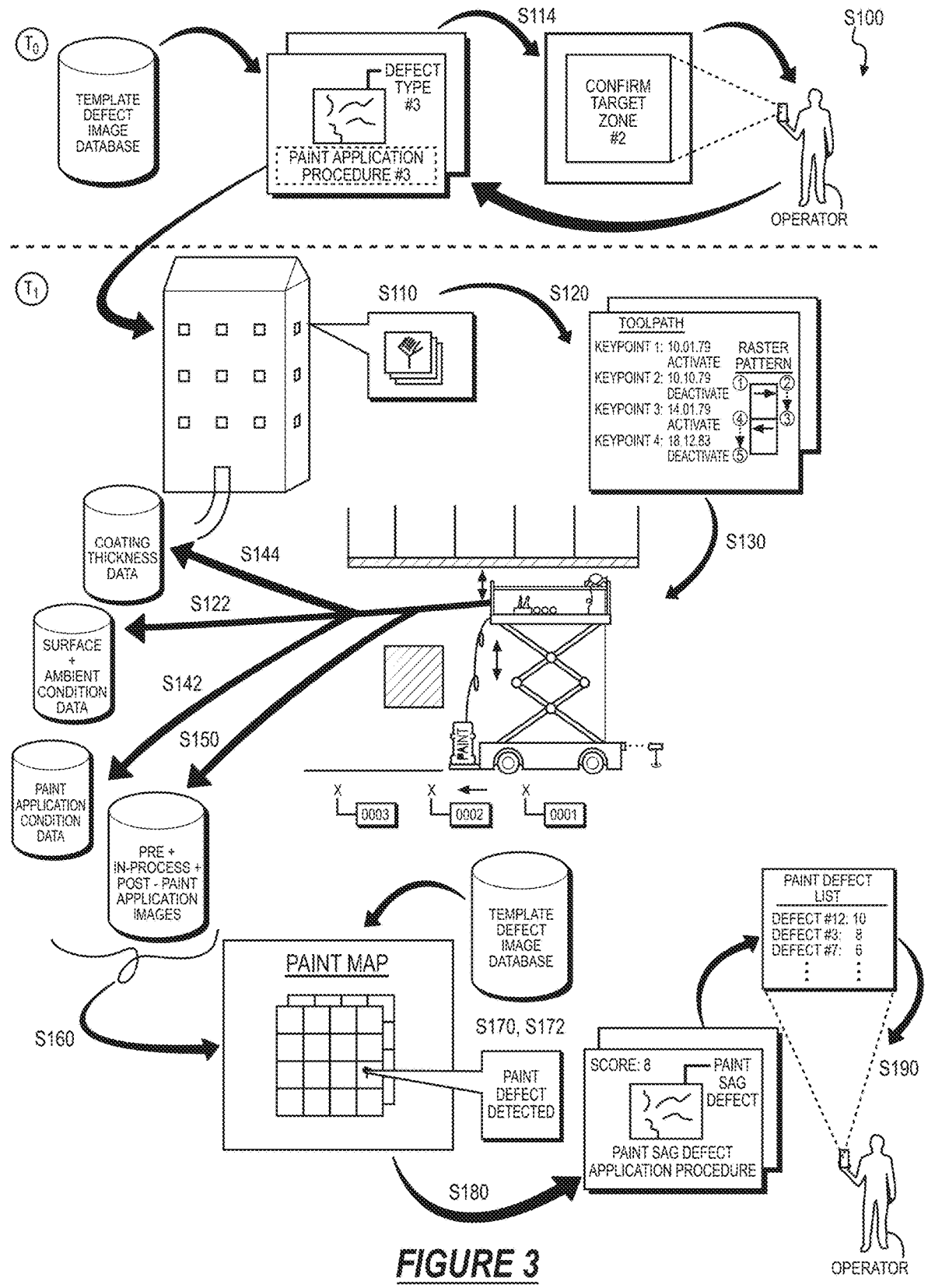
FIG. 3 is a flowchart representation of one variation of the method.

In one implementation shown in FIG. 3, the computer system can access a template defect image database containing defect images (e.g., images depicting paint defects) labeled with a defect type, a defect score, and an action (e.g., a paint application procedure). The computer system can then match features of images from the post-paint application layer of the paint map to analogous features of defect images from the template defect image database to identify paint defects on segments of the target surface. Furthermore, the computer system can compile a list of paint defects on the target surface, ranked by defect score, and serve this list to the operator and thereby, enable the operator to selectively review paint defects in a sequential order according to the list.

In one variation, the computer system can retrieve a set of paint defect images from the template defect image database, each paint defect image in the set of defect images labeled with a defect type (e.g., incomplete coverage defect, sag paint defect, rust paint defect, flaking paint defect, paint blister defect, run paint defect, curtain paint defect) a defect score, and a paint application procedure (e.g., series of actions to remove the paint defect). Then, in response to the sequence of images from the post-paint application layer of the paint map corresponding to the set of paint defect images, the computer system can: annotate the sequence of images with the corresponding defect type, defect score, and paint application procedure within the paint map; compile a list of paint defects of the target surface, ranked by defect score; and serve the paint map and the list of paint defects of the target surface to an operator (e.g., via the operator portal).

For example, the computer system can retrieve a first paint defect image—labeled with a paint sag defect type and a paint sag application procedure—from the template defect image database. Then, in response to a first image from the post-paint application layer of the paint map corresponding to the first paint defect image, the computer system can: annotate the first image with the paint sag defect type and the paint sag application procedure within the paint map; and initiate a second paint application cycle to remove the paint sag defect from the target surface based on the paint sag application procedure.

Therefore, the computer system and system cooperate to enable the operator and/or the building associate to target the most significant paint defects (e.g., severe paint defects) from a paint application procedure according to the list of paint defects.

13. Live Process Report

In one variation shown in FIG. 1B, the computer system: implements methods and techniques described above to annotate the paint map (e.g., the building model) with regions of the building completed by the system based on color images, depth maps, and/or spray nozzle position data captured by the system; highlights regions of the building completed by the system; and presents the paint map—with highlighted regions—to the operator and/or the building associate.

Additionally or alternatively, the computer system can: calculate a proportion (or ratio) of paint application on the building completed by the system; and present this proportion to the operator and/or the building associate.

Additionally or alternatively, the computer system can: predict a time to completion at which the system will complete application of paint on the whole building, such as based on the remaining unpainted area of the building and the current raster speed of the set of spray nozzles; and present this time to completion to the operator and/or the building associate.

Furthermore, the computer system can present the paint map—such as the pre- and post-paint application layers of the paint map—to the building associate, thereby enabling the building associate to immediately and remotely review and inspect the condition of the building prior to application of paint and after application of paint.

14. Variation: Paint Application on Ship Aircraft

Generally, the computer system and system cooperate to autonomously apply (e.g., spray, dispense) paint onto exterior and/or interior walls (e.g., target surfaces) of a building during a paint application procedure; to capture pre-paint application, in-process paint application, and/or post-paint application images of these walls of the building during the paint application procedure; capture surface condition, ambient condition, paint application condition, spray system operation, and spray nozzle position data during the paint application procedure; estimate thicknesses of paint (e.g., volumes of paint, coats of paint) applied within discrete (e.g., one-foot-square) segments across these walls of the building based on these data; compile these data into a paint map of the building representing paint application data and results of the paint application procedure; and flag regions of the paint map exhibiting paint conditions deviating from the paint application specification.

However, the system and computer system can cooperate to autonomously apply (e.g., spray, dispense) paint onto exterior and/or interior walls of a ship aircraft (e.g., target mobile surface, target curved surfaces) during a paint application procedure; to maintain peripheral and center distances between the set of spray nozzles and walls of the ship aircraft within the target standoff distance range during a paint application cycle; to maintain the set of spray nozzles substantially normal to each segment of the wall of the ship aircraft; to capture pre-paint application, in-process paint application, and/or post-paint application images of these walls of the ship aircraft during the paint application procedure; capture surface condition, ambient condition, paint application condition, spray system operation, and spray nozzle position data during the paint application procedure; estimate thicknesses of paint (e.g., volumes of paint, coats of paint) applied within discrete (e.g., one-foot-square) segments across these walls of the ship aircraft based on these data; compile these data into a paint map of the ship aircraft representing paint application data and results of the paint application procedure; and flag regions of the paint map exhibiting paint conditions deviating from the paint application specification.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method comprising:
   during a first paint application cycle:
   triggering a set of actuators coupled to a set of spray nozzles to navigate the set of spray nozzles across a first segment of the target surface;
   in response to the first set of spray nozzles facing the first segment of the target surface, applying paint onto the first segment of the target surface via the set of spray nozzles; and
   accessing a first image, depicting paint applied on the first segment of the target surface, captured by an optical sensor arranged adjacent the set of spray nozzles;
   during a second paint application cycle:
   triggering the set of actuators to navigate the set of spray nozzles across a second segment above the first segment of the target surface;
   in response to the first set of spray nozzles facing the second segment of the target surface, applying paint onto the second segment of the target surface via the set of spray nozzles; and
   accessing a second image, depicting paint applied on the second segment of the target surface, captured by the optical sensor; and
   combining the first image and the second image into a composite image representing application of paint onto the first segment and the second segment of the target surface.

2. The method of claim 1:
   further comprising, during the first paint application cycle:
   projecting a set of reference features, visible to an user, onto the first segment of the target surface; and
   prompting the user to confirm alignment of the set of reference features with the first segment of the target surface; and
   wherein applying paint onto the first segment of the target surface comprises applying paint onto the first segment of the target surface via the set of spray nozzles:
   in response to receiving confirmation of the set of reference features from the user; and
   in response to the set of spray nozzles facing the set of reference features on the first segment of the target surface.

3. The method of claim 2:
   further comprising, during the second paint application cycle:
   traversing the set of reference features vertically from the first segment to the second segment of the target surface;
   projecting the set of reference features onto the second segment of the target surface; and
   prompting the user to confirm alignment of the set of reference features with the second segment of the target surface; and
   wherein applying paint onto the second segment of the target surface comprises applying paint onto the second segment of the target surface via the set of spray nozzles:
   in response to receiving confirmation of the set of reference features from the user; and
   in response to the set of spray nozzles facing the set of reference features on the second segment of the target surface.

4. The method of claim 1:
   further comprising, during the first paint application cycle:
   projecting a set of reference features, visible to an user, onto the first segment of the target surface;
   prompting the user to confirm alignment of the set of reference features with the first segment of the target surface;
   in response to receiving confirmation of alignment of the set of reference features with the first segment of the target surface from the user, calculating a target distance range between the set of spray nozzles and the first segment of the target surface; and
   interpreting a first distance between the set of spray nozzles and the first segment of the target surface based on a signal output by a distance sensor adjacent the optical sensor; and
   wherein applying paint onto the first segment of the target surface comprises, in response to the first distance falling within the target distance range, applying paint onto the first target zone within the first segment of the target surface via the set of spray nozzles.

5. The method of claim 1, further comprising:
   during a scan cycle prior to the first paint application cycle:
   accessing a third image, depicting the target surface prior to application of paint, captured by the optical sensor; and
   storing the first image as a first pre-paint application map representing the target surface prior to application of paint; and
   during the first paint application cycle:
   detecting a paint flow rate of paint through the set of spray nozzles;
   calculating a width of a spray field, discharged by the set of spray nozzles, at the first segment of the target surface based on the paint flow rate and the distance;
   accessing a speed of the set of spray nozzles specified for the first paint application cycle;
   generating a paint thickness of paint applied on the first segment of the target surface based on the width of the spray field and the speed of the set of spray nozzles; and
   annotating the composite image with the paint thickness.

6. The method of claim 1:
   further comprising, during the first paint application cycle:
   detecting a first ambient air temperature of air adjacent the first segment of the target surface;
   detecting a first surface temperature of the first segment of the target surface;
   predicting a first quality of paint applied on the first segment of the target surface based on the first ambient air temperature, the first surface temperature, and the first paint thickness; and
   in response to the first quality of paint exceeding a threshold quality of paint, setting the first paint thickness as a target paint thickness for the second paint application cycle;
   wherein applying paint onto the second segment of the target surface comprises applying a coat of paint corresponding to the target paint thickness onto the second segment of the target surface; and
   further comprising annotating the composite image with the first paint thickness, the first ambient air temperature, the first surface temperature, and the first paint quality to generate a paint map representing application of paint onto the first segment and the second segment of the target surface.

7. The method of claim 1:
further comprising, during the first paint application cycle:
   interpreting a first distance between the set of spray nozzles and the first segment of the target surface based on a signal output by a depth sensor adjacent the optical sensor; and
   in response to the first distance falling below a target standoff distance range between the set of spray nozzles and the first segment of the target surface, setting a second distance within the target standoff distance range for the second paint application cycle;
wherein triggering the set of actuators to navigate the set of spray nozzles across the second segment comprises triggering the set of actuators to navigate the set of spray nozzles over and offset from the second segment by the second distance; and
further comprising, during the second paint application cycle:
   in response to locating the set of spray nozzles normal to the target surface, applying paint onto the second segment of the target surface via the set of spray nozzles.

8. The method of claim 1:
wherein applying paint onto the first segment of the target surface comprises, in response to the first set of spray nozzles facing the first segment of the target surface, applying paint laterally across the first segment of the target surface via the set of spray nozzles in a leftward direction;
further comprising, during the first paint application cycle:
   at a right near-field camera adjacent the set of spray nozzles, capturing the first image depicting paint applied on the first segment of the target surface; and
wherein accessing the first image, depicting paint applied on the first segment of the target surface, captured by the optical sensor comprises accessing the first image, depicting paint applied on the first segment of the target surface, captured by the right camera.

9. The method of claim 8:
wherein applying paint onto the second segment of the target surface comprises, in response to the first set of spray nozzles facing the second segment of the target surface, applying paint onto the second segment of the target surface via the set of spray nozzles in a rightward direction;
further comprising, during the first paint application cycle:
   at a left near-field camera adjacent the set of spray nozzles and opposite the right near-field camera, capturing the second image depicting paint applied on the second segment of the target surface; and
wherein accessing the second image, depicting paint applied on the second segment of the target surface, captured by the optical sensor comprises accessing the second image, depicting paint applied on the second segment of the target surface, captured by the left near-field camera.

10. The method of claim 1:
wherein accessing the first image depicting paint applied on the first segment of the target surface comprises accessing a sequence of images, comprising the first image, depicting paint applied on the first segment of the target surface, captured by the optical sensor;
wherein accessing the second image depicting paint applied on the second segment of the target surface comprises accessing a second sequence of images, comprising the second image, depicting paint applied on the second segment of the target surface captured by the optical sensor; and
wherein combining the first image and the second image into the composite image comprises assembling the first sequence of images and the second sequence of images into a paint map representing application of paint onto the first segment and the second segment of the target surface.

11. The method of claim 1:
further comprising:
   accessing a threshold overspray distance between the set of spray nozzles and the target surface, the threshold overspray distance specified for the first segment of the target surface;
   detecting an object, within the threshold overspray distance of the first segment of the target surface based on the first image; and
   in response to detecting the object within the threshold overspray distance, prompting a user to remove the object; and
wherein triggering the set of actuators to navigate the set of spray nozzles across the first segment of the target surface comprises, in response to receiving confirmation of removal of the object, triggering the set of actuators to navigate the set of spray nozzles across the first segment of the target surface.

12. The method of claim 1:
wherein triggering the set of actuators to navigate the set of spray nozzles across the first segment of the target surface comprises triggering the set of actuators to vertically traverse the set of spray nozzles across the first segment of the target surface;
wherein applying paint onto the first segment of the target surface comprises applying paint laterally onto the first segment of the target surface via the set of spray nozzles;
wherein navigating the set of spray nozzles across the second segment of the target surface comprises triggering the set of actuators to vertically traverse the set of spray nozzles across the second segment of the target surface; and
wherein applying paint onto the second segment of the target surface comprises applying paint laterally onto the second segment of the target surface via the set of spray nozzles.

13. A method comprising:
accessing a first image, depicting a target surface, captured by an optical sensor mounted adjacent a set of spray nozzles;
based on the first image:
   identifying a first marker on a first segment of the target surface; and
   identifying a second marker on a second segment above the first segment of the target surface;
defining a target zone on the first segment of the target surface based on the first marker;
defining a keepout zone, adjacent the target zone, on the second segment of the target surface based on the second marker;

during a first paint application cycle:
  navigating the set of spray nozzles across the first segment of the target surface; and
  in response to the set of spray nozzles facing the first segment of the target surface, activating the set of spray nozzles to apply paint onto the target zone within the first segment of the target surface; and
during a second paint application cycle:
  navigating the set of spray nozzles across the second segment of the target surface; and
  in response to a subset of spray nozzles, in the set of spray nozzles, facing the second segment of the target surface, deactivating the subset of spray nozzles, in the set of spray nozzles, to prevent application of paint onto the keepout zone within the second segment of the target surface.

14. The method of claim 13, further comprising:
during the first paint application cycle, accessing a second image, depicting paint applied onto the target zone within the first segment of the target surface, captured by the optical sensor;
during the second paint application cycle, accessing a third image of the second segment of the target surface captured by the optical sensor;
storing the first image as a first pre-paint application map representing the target surface prior to application of paint; and
storing the third image as a first post-paint application map representing application of paint onto the target zone within the first segment of the target surface.

15. The method of claim 13:
further comprising, during the first paint application cycle, projecting a set of reference features, visible to an user, onto the first segment of the target surface; and
wherein activating the set of spray nozzles to apply paint onto the target zone within the first segment of the target surface comprises, in response to the set of spray nozzles facing the first segment of the target surface, activating the set of spray nozzles to apply paint onto the first segment of the target surface, between the set of reference features, via the set of spray nozzles.

16. The method of claim 15, further comprising:
further comprising, during the first paint application cycle:
  prompting an user to confirm alignment of the set of reference features to the first target zone within the first segment of the target surface; and
  in response to receiving confirmation of the set of reference features from the user:
    calculating a first standoff distance between the set of spray nozzles and the first segment of the target surface;
    defining a first flow rate of paint through the set of spray nozzles; and
    defining a first speed of the set of spray nozzles for application of paint onto the first segment of the target surface; and
wherein activating the set of spray nozzles to apply paint onto the target zone within the first segment of the target surface comprises activating the set of spray nozzles to apply paint onto the first segment of the target surface, between the set of reference features, via the set of spray nozzles based on the first standoff distance, the first flow rate, and the first speed.

17. The method of claim 13, further comprising:
accessing dimensions of a building comprising the target surface;
based on the dimensions of the building:
  deriving a first width of the first segment of the target surface;
  deriving a first height of the first segment of the target surface;
  deriving a second width of the second segment of the target surface; and
  deriving a second height of the second segment of the target surface;
defining a first set of lateral raster legs based on the first width of the first segment and the second width of the second segment of the target surface;
defining a second set of vertical raster legs, connecting the first set of lateral raster legs, based on the first height of the first segment and the second height of the second segment of the target surface; and
compiling the first set of lateral raster legs and the second set of vertical raster legs into a boustrophedonic raster pattern for execution by a spray system, comprising the set of spray nozzles, during the first paint application cycle and the second paint application cycle.

18. The method of claim 13:
further comprising, based on the first image:
  identifying a first masking tape color on the first segment of the target surface; and
  identifying a second masking tape color on the second segment of the target surface;
wherein defining the target zone on the first segment of the target surface comprises defining the target zone on the first segment of the target surface based on the first masking tape color; and
wherein defining the keepout zone, adjacent the target zone, on the second segment of the target surface comprises defining the keepout zone, adjacent the target zone, on the second segment of the target surface based on the second masking tape color.

19. The method of claim 13:
wherein navigating the set of spray nozzles across the first segment of the target surface comprises triggering a set of actuators, coupled to the set of spray nozzles, to vertically traverse the set of spray nozzles across the first segment of the target surface;
wherein applying paint onto the first segment of the target surface comprises applying paint laterally onto the first segment of the target surface via the set of spray nozzles; and
wherein navigating the set of spray nozzles across the second segment of the target surface comprises triggering the set of actuators to vertically traverse the set of spray nozzles across the second segment of the target surface.

20. A method comprising:
during a first paint application cycle:
  triggering a set of actuators, coupled to a set of spray nozzles, to navigate the set of spray nozzles across a first segment of the target surface;
  applying paint onto the first segment of the target surface via the set of spray nozzles; and
  accessing a first image, depicting paint applied on the first segment of the target surface, captured by an optical sensor arranged adjacent the set of spray nozzles;
during a second paint application cycle:
  triggering the set of actuators to navigate the set of spray nozzles across a second segment above the first segment of the target surface;

applying paint onto the second segment of the target surface via the set of spray nozzles; and accessing a second image, depicting paint applied on the second segment of the target surface, captured by the optical sensor; and combining the first image and the second image into a composite image representing application of paint onto the first segment and the second segment of the target surface.

* * * * *